United States Patent [19]
Kotani et al.

[11] Patent Number: 5,257,060
[45] Date of Patent: Oct. 26, 1993

[54] AUTOFOCUS CAMERA AND A METHOD OF REGULATING THE SAME

[75] Inventors: Takaaki Kotani; Seiji Takada, both of Tokyo; Shigenori Goto; Tatsuo Saito, both of Saitama, all of Japan

[73] Assignees: Fuji Photo Film Co., Ltd., Kanagawa; Fuji Photo Optical Co., Ltd., Saitama, both of Japan

[21] Appl. No.: 779,881

[22] Filed: Oct. 21, 1991

[30] Foreign Application Priority Data

Oct. 20, 1990 [JP] Japan .................................. 2-282916
Oct. 20, 1990 [JP] Japan .................................. 2-282917

[51] Int. Cl.$^5$ ............................................ G03B 13/36
[52] U.S. Cl. ..................................... 354/402; 354/403
[58] Field of Search ................. 354/21, 412, 400, 402, 354/403

[56] References Cited

U.S. PATENT DOCUMENTS

| | | | |
|---|---|---|---|
| 4,423,934 | 1/1984 | Lambeth et al. | 354/402 |
| 4,887,105 | 12/1989 | Ishikawa et al. | 354/412 |
| 4,903,055 | 2/1990 | Lourette et al. | 354/21 |
| 4,924,253 | 5/1990 | Imai et al. | 354/400 |
| 4,945,365 | 7/1990 | Fujino | 354/412 |
| 4,962,397 | 10/1990 | Ishikawa et al. | 354/412 |
| 5,134,431 | 7/1992 | Ishimura et al. | 354/400 |

*Primary Examiner*—Russell E. Adams
*Attorney, Agent, or Firm*—Young & Thompson

[57] ABSTRACT

A CPU writes in a RAM various data obtained in a rangefinding procedure, e.g. offset values, gain values, data actually measured using a series of rangefinding LEDs, corresponding distance data obtained from each of the measurement data, and the optimum distance data used for setting a taking lens. When specifying an inspection mode, a microcomputer reads these written data out of the RAM to indicate them on an LCD numerically. Light emitting diode displays output the write data as light signals in intermittent light emission. To correct an error in the mounting position of the rangefinding LEDs, correction data are generated and written beforehand in an erasable ROM.

34 Claims, 18 Drawing Sheets

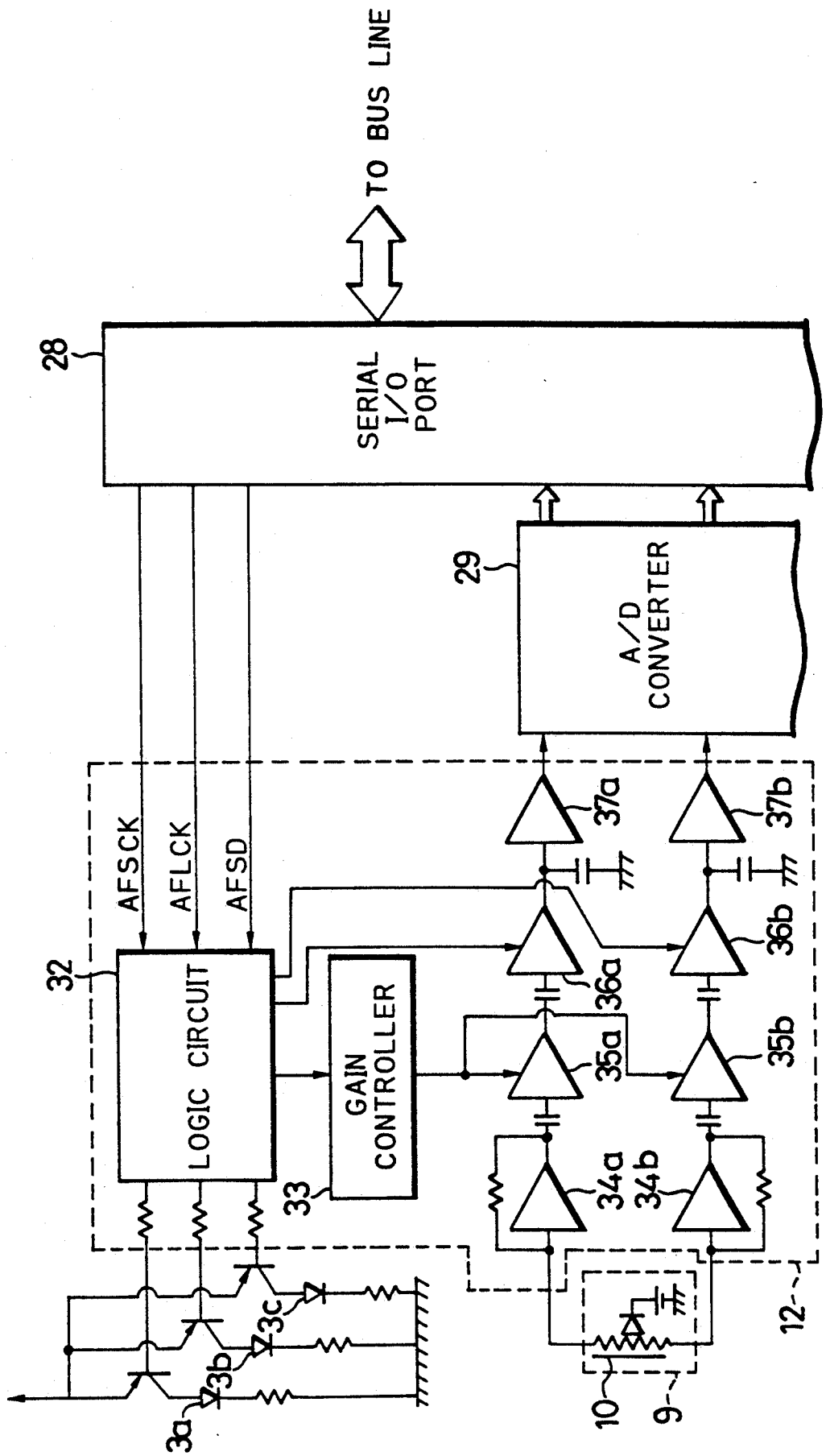

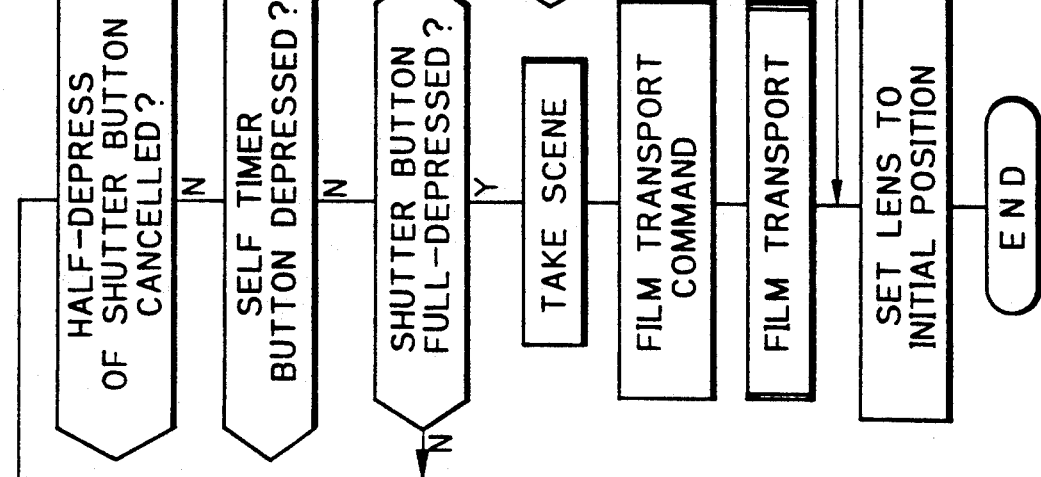
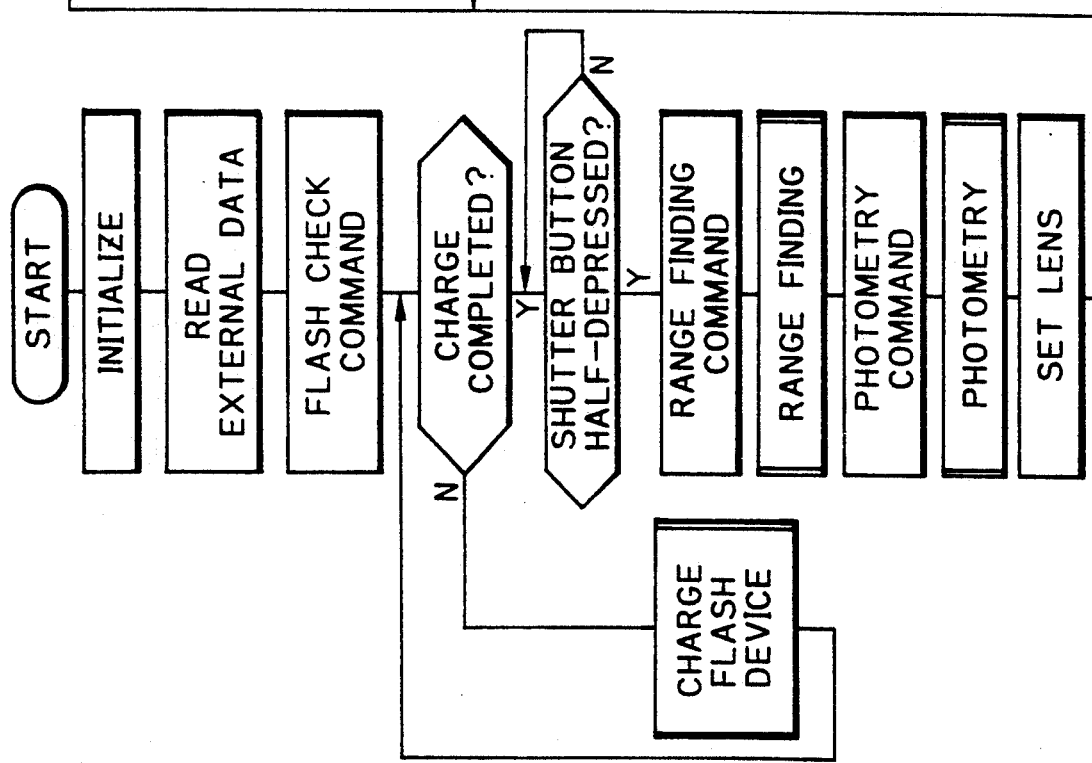
FIG. 7

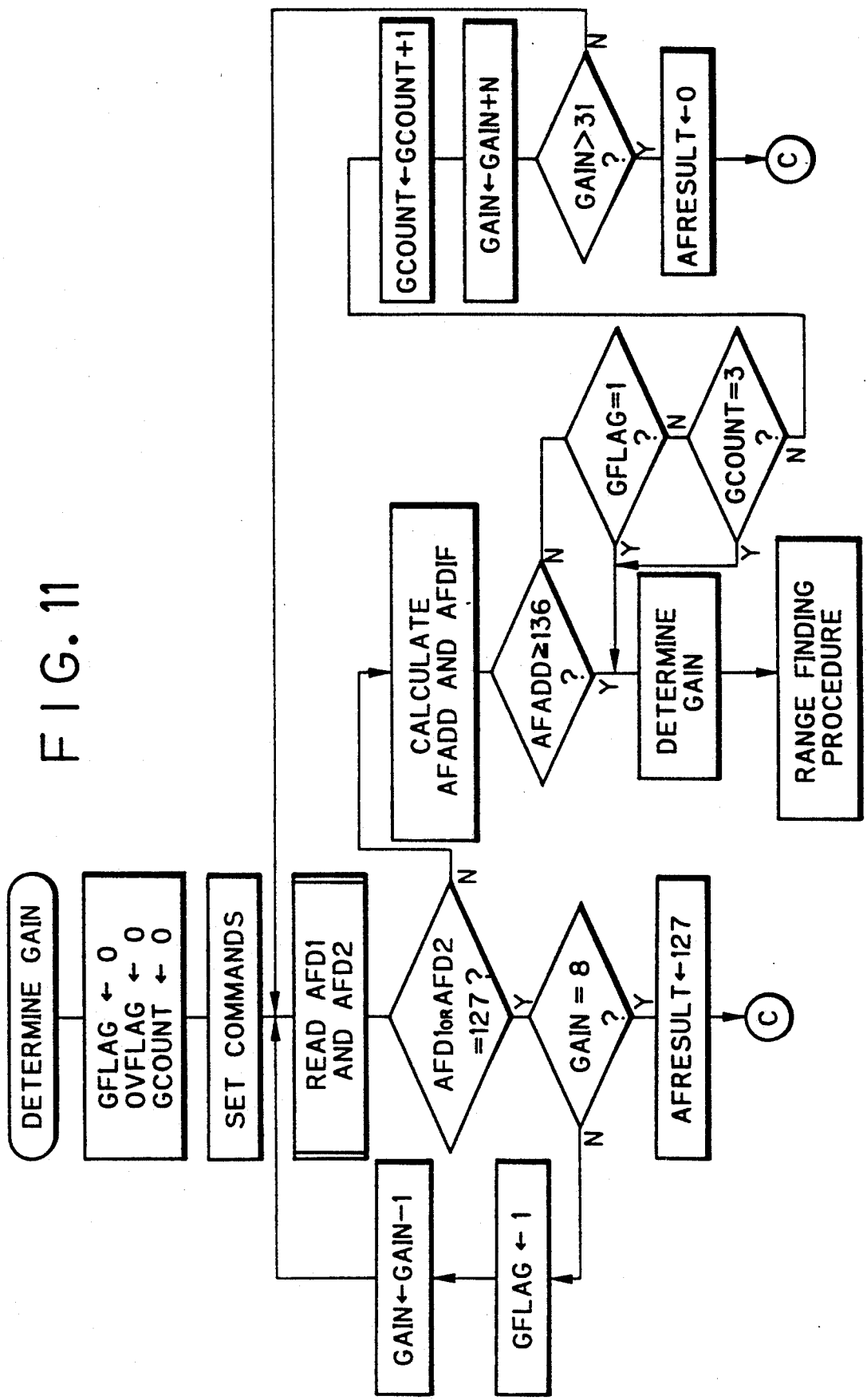
F I G. 11

FIG. 18

| A/D BIT VALUE (ADDRESS) | CORRECTION AMOUNT Y | | A/D BIT VALUE | CORRECTION AMOUNT Y | |
|---|---|---|---|---|---|
| | LED 3b | LED 3c | | LED 3b | LED 3c |
| 255~249 | 0 | 0 | 101~95 | 3 | -8 |
| 248~242 | -8 | -8 | 94~88 | 3 | -4 |
| 241~235 | -8 | -4 | 87~81 | 3 | 0 |
| 234~228 | -8 | 0 | 80~74 | 3 | 3 |
| 227~221 | -8 | 3 | 73~67 | 3 | 7 |
| 220~214 | -8 | 7 | 66~60 | 7 | -8 |
| 213~207 | -4 | -8 | 59~53 | 7 | -4 |
| 206~200 | -4 | -4 | 52~46 | 7 | 0 |
| 199~193 | -4 | 0 | 45~39 | 7 | 3 |
| 192~186 | -4 | 3 | 38~32 | 7 | 7 |
| 185~179 | -4 | 7 | 31~25 | | |

ND A METHOD OF
AUTOFOCUS CAMERA AND A METHOD OF REGULATING THE SAME

BACKGROUND OF THE INVENTION

1. Field of the Invention

The present invention relates to an autofocus camera provided with a rangefinding device of a multi-beam type, and to a method for regulating such a rangefinding device, more particularly to an autofocus camera in which the operating state of the rangefinding device can be checked in an inspection during production, and to a method for correcting an error in the measurement performed by the rangefinding device.

2. Description of Related Art

Multi-beam type rangefinding devices are widely used in modern compact cameras. Rangefinding devices of this type have a light projector for projecting a plurality of light beams sequentially and horizontally relative to a photographic scene, and a light receiver for receiving the light beams reflected by the photographic scene so as to detect their incident positions. As a light source for the light projector, LEDs (light emitting diodes) emitting near infrared light are used arranged in a line. As the light receiver, a PSD (semi-conductor position sensitive detector) is used. When there are a plurality of principal objects in the photographic scene, rangefinding data are calculated for each of the respective rangefinding light beams. An optimum rangefinding datum is selected from among them a distance datum for determining the position at which a taking lens is to be set.

Among the optimum rangefinding data, there are provided a near distance selection, a medium distance selection, and the like. According to the near distance selection, the rangefinding datum of the nearest object is selected as being optimum. Therefore, the multi-beam rangefinding device has the advantage of ease in focussing the principal object, without the inconvenience of performing focus-lock or the like, even when the principal object is situated outside the center of the photographic scene, or when a plurality of persons standing in a line are photographed.

In the process of assembling an autofocus camera, an inspection is performed after the rangefinding device is incorporated in the camera body, to determine whether the rangefinding device can be properly operated. In such an inspection, a test object positioned at a predetermined object distance is used for adjusting the mounting positions of the light projector and the light receiver while measuring the position of the taking lens in correspondence with each LED, so that light beams emitted from all the LEDs generate rangefinding data of an equal value for the same test object.

In this conventional inspecting method, there are problems of low efficiency in operation and possible differences in the respective LEDs as regards precision of rangefinding. This is because it is necessary to measure the taking lens setting position for each of the rangefinding light beams in order to adjust the positions of the light projector and the light receiver, whereas another operation of rangefinding is required for checking the completion of adjustment.

SUMMARY OF THE INVENTION

It is therefore a principal object of the present invention to provide an autofocus camera which can be easily inspected and adjusted, and a method of regulating the same.

It is another object of the present invention to provide an autofocus camera capable of performing rangefinding with high precision, as well as a method therefor.

It is still another object of the present invention to provide an autofocus camera which can be inspected to determine the operating condition of a rangefinding device, without measuring the setting position of the taking lens.

It is a further object of the present invention to provide an adjusting method in which no difference in the precision of rangefinding exists between respective light sources, by performing a correction calculation as to each light source, and in which no change in the mounting position of each light source is needed.

The operating condition of a rangefinding device must be inspected to determine the rangefinding precision thereof, and to adjust the same as needed. It is possible to inspect this operating condition by writing in a memory measurement data obtained in a test rangefinding and various data determined or obtained in a rangefinding calculation, and by reading the data from the memory after the test rangefinding so as to indicate the written data on a light emitting indicator or a liquid crystal display.

Adjusting the mounting position of the light projector is highly laborious when the rangefinding data of the respective light sources must be equal. The present invention comprises a memory in which at least one correction datum is written beforehand, the correction datum being the difference of a reference distance datum from at least one other distance datum. The reference distance datum is obtained by performing rangefinding of a test object with a reference light beam that is one of the plurality of rangefinding light beams, whereas the at least one other distance datum is obtained by performing rangefinding of the test object with another light beam, with an additional correction datum being correspondingly obtained for each additional light beam.

In accordance with the present invention, the operating condition of the rangefinding device can be easily inspected with little extra cost, because the various data written in the memory during the test rangefinding can be externally indicated on the camera by use of the same light emitting indicator or liquid crystal display that is provided for indicating the number of exposed frames, the photography mode the like. The number of processes for assembling the camera can thus be greatly reduced, because correction data are obtained beforehand for the respective light sources for correcting subsequent rangefinding data, with no need of finely adjusting the mounting positions of the light sources. These correction data can be calculated using the normal sequence of rangefinding calculation, thereby simplifying operation and improving efficiency without need of a complicated measuring circuit or analyzing apparatus.

BRIEF DESCRIPTION OF THE DRAWINGS

The above and other objects and advantages of the present invention will become more readily apparent to those skilled in this art from the following detailed description of various embodiments of the invention when read in connection with the accompanying drawings, in which:

FIG. 4 is a block diagram showing the structure of an autofocus IC;

FIG. 7 is a flow chart showing a photographing sequence of the camera;

FIG. 11 is a flow chart showing the procedure of determining a gain;

FIG. 18 conceptually illustrates a correction data reference table;

DETAILED DESCRIPTION OF THE PREFERRED EMBODIMENTS

Figure 1:
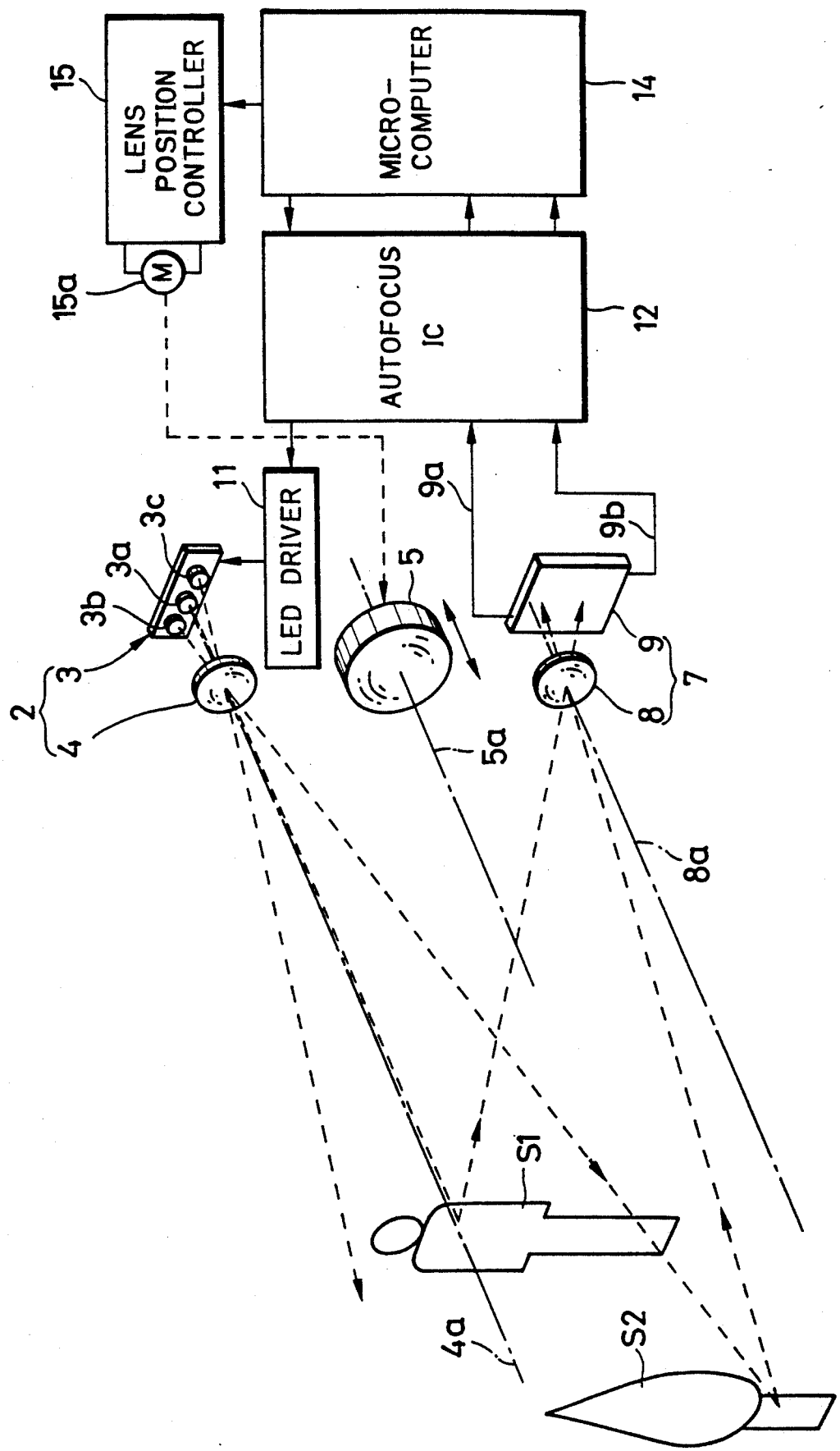
FIG. 1 is an explanatory diagram showing the overall configuration of a rangefinding device of a multi-beam type.

FIG. 1 shows a multi-beam active type rangefinding device, in which a light projector 2 comprises a light source 3 and a light projecting lens 4. The optical axis 4a of the light projecting lens 4 is substantially parallel to the optical axis 5a of a taking lens 5. The light source 3 has three LEDs (light emitting diodes) 3a, 3b and 3c for emitting near infrared light. These LEDs 3a, 3b and 3c are disposed horizontally relative to the camera body, with the middle LED 3a being positioned on the optical axis 4a and the LEDs 3b and 3c being positioned on either side of the LED 3a. Spot light beams are sequentially projected form the LEDs toward three areas disposed laterally in a photographic scene.

A light receiver 7 comprises a light receiving lens 8 and a PSD 9. The optical axis 8a of the light receiving lens 8 is substantially parallel to the optical axis 5a of the taking lens 5. The PSD 9 has a filter 10 (see FIG. 4) mounted on its light receiving surface for admitting only near infrared light. Electrical currents corresponding to the amount and position of the incident light passed through the filter 10 are output from output terminals 9a and 9b of the PSD 9. The shorter an object distance, the nearer to the output terminal 9b the reflected light from the object will be incident upon the light receiving surface of the PSD 9. The nearer an object, the larger the intensity of the reflected light so that the absolute values of the currents form the output terminals 9a and 9b become large. However, a signal dependent upon only the incident position can be obtained by calculating a sum-to-difference ratio of the output currents, irrespective of the intensity of the reflected light.

Light emission from the LEDs 3a to 3c is controlled by a signal supplied via an LED driver 11 from an autofocus IC 12. This autofocus IC 12 executes a predetermined rangefinding sequence to activate the LED driver 11, in accordance with a command from a microcomputer 14. The autofocus IC 12 amplifies signals from the output terminals 9a and 9b of the PSD 9, samples and holds them, and supplies them to the microcomputer 14.

The microcomputer 14 is of a general purpose type, and calculates first and second channel signals supplied via the output terminals 9a and 9b to obtain a distance datum. When there are a plurality of principal objects, one of the at least three distance data is selected to the exclusion of the others. When there is no particular principal object, a distance datum corresponding to a distance of infinity is calculated, as the PSD has received no reflected light beam. Accordingly, at least three distance data possibly including an infinity datum are continually calculated for each of the LEDs 3a to 3c. The taking lens position controller 15 receives driving pulses corresponding in number to a distance datum from the microcomputer 14, and drives a stepping motor 15a to move the taking lens 5 to the in-focus position.

Figure 2:
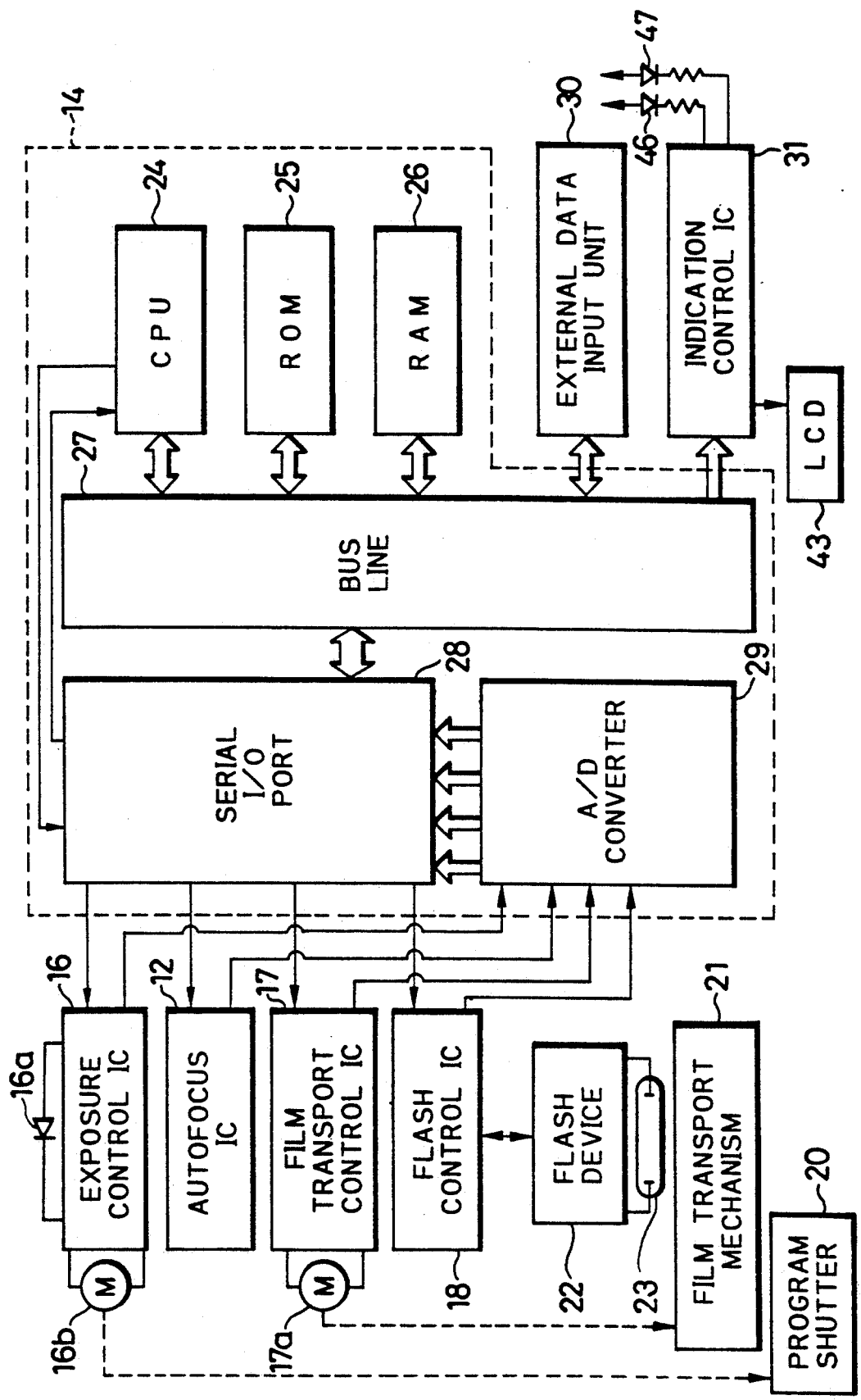
FIG. 2 is a block diagram showing the electrical arrangement of an autofocus camera according to an embodiment of the present invention.
Figure 3:
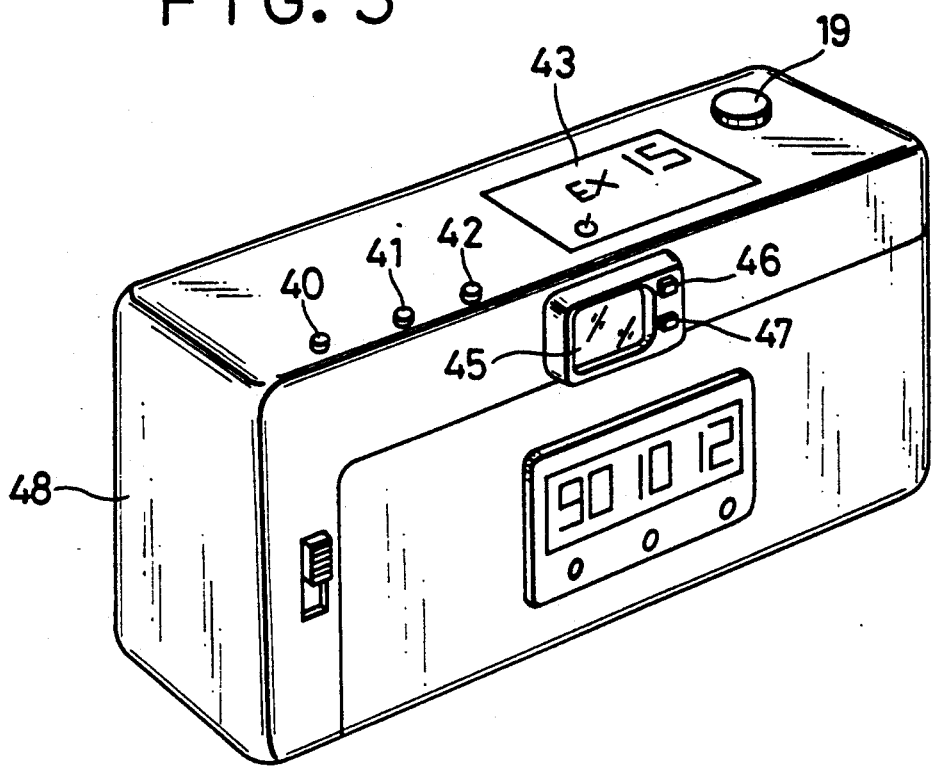
FIG. 3 is a rear perspective view of an autofocus camera.

The microcomputer 14, as illustrated in FIG. 2, controls an exposure control IC 16, film transport control IC 17, flash control IC 18, external data input unit 30, and indication control IC 31. The exposure control IC 16 calculates an exposure time and aperture value for a proper exposure in accordance with the object brightness as detected by a photometric element 16a and film sensitivity, and controls a program shutter 20 by driving a stepping motor 16b. As shown in FIG. 3, the external data input unit 30 comprises a shutter button 19, a self-timer button 40, a daylight synchro button 41, an exposure correcting button 42, and the like. The indication control IC 31 is connected to a liquid crystal display panel (LCD) 43 and LEDs 46 and 47. The LCD 43 indicates the number of exposed frames and photography mode in the form of numbers, letters or marks. The LED 46 is actuated to indicate completion of rangefinding, whereas the LED 47 is actuated when flash photography is selected due to low brightness of a photographic scene. Reference numeral 45 in FIG. 3 designates a viewfinder. The camera body is designated with reference numeral 48.

As shown in FIG. 2, the general purpose microcomputer 14 is constructed of a CPU 24, a ROM 25, a RAM 26, a bus line 27, a serial I/O port 28, and an A/D converter 29. As is well known, the CPU 24 has various registers and an arithmetic logic circuit, and executes a photography sequence in accordance with sequence programs written in the ROM 25. The RAM 26 temporarily stores data obtained from the autofocus IC 12, the exposure control IC 16, the film transport IC 17, and the flash control IC 18 during execution of the photography sequence, as well as address data and flag data output while the sequence program is executed. The bus line 27 includes an address bus and a data bus for the data transfer of the CPU 24 to or from the ROM 25 and the RAM 26.

The serial I/O port 28 includes a parallel/serial converter circuit for converting a command datum output as a parallel datum from CPU 24 into a serial datum, which is then supplied to each IC. Analog datum output from each IC is digitized by the A/D converter 29 and supplied as parallel datum having a predetermined number of bits to the serial I/O port 28 and to the bus line 27.

After exposing a frame, a command is sent from the microcomputer 14 to the film transport control IC 17 to drive a film transport mechanism 21 via a motor 17a and start transporting the film. The amount of film transport is measured by counting the number of perforations in the film. When the amount of film transport reaches one frame (e.g., eight perforations), a stop command is supplied to the film transport control IC 17 to stop the film. The flash control IC 18 causes the flash device 22 to be driven when the exposure time calculated by the exposure control IC 16 is too long, so that a flash bulb 23 is energized in synchronism with the operation of the program shutter 20. So long as the power switch (not shown) of the camera is turned on, the flash control IC 18 always monitors the charge level of the main capacitor (not shown) of the flash device 22, and if the level is lower than a predetermined level, the capacitor is automatically charged.

In ordinary use of the camera, a desired photography mode is specified by pressing one or more of the self-timer mode button 40, the daylight synchro button 41, and the exposure correction button 42. After rangefinding is performed upon half-depressing the shutter button 19, the self-timer mode 40 is performed to maintain the state of this half-depression, in which a secret command is entered in the CPU 24 via the external data input unit 30. Upon entering the secret command in the CPU 24, an inspection mode is selected in which the data stored in the RAM 26 are indicated successively.

Reference is now made to FIG. 4 showing an overview of the autofocus IC 12. The autofocus IC 12 is a one chip IC constructed of a logic circuit 32, a gain controller 33, preamplifiers 34a and 34b for converting into voltage signals the first and second channel currents output from the output terminals 9a and 9b of the PSD 9, gain control amplifiers 35a and 35b, sample-and-hold circuits 36a and 36b, buffer amplifiers 37a and 37b, and other circuits. The construction of the autofocus IC 12 is described in U.S. patent application Ser. No. 07/600,821 filed Oct. 22, 1990.

The gain control amplifiers 35a and 35b are provided in consideration of the fact that, if an object is far away, the amount of the reflected light incident upon the PSD 9 becomes small and the absolute values of currents from the output terminals 9a and 9b may become too small. The gain of each gain control amplifier is therefore set at an optimum value in accordance with the gain control process to be described later. The sample-and-hold circuits 36a and 36b sample and hold signals amplified by the gain control amplifiers 35a and 35b in response to sampling pulses from the logic circuit 32. The sample-and-hold signals are supplied via the buffer amplifiers 37a and 37b to the A/D converter 29 of the microcomputer 14. The logic circuit 32 is basically constructed of a shift register of a serial-in and parallel-out type. The gain controller 33 reads gain control data from the shift register at predetermined bit positions to set the gains of the gain control amplifiers 35a and 35b.

As described before, the serial I/O port 28 converts parallel command data from the CPU 24 to serial data pulses (AFSD) and supplies them to the logic circuit 32. The serial I/O port 28 also outputs transfer pulses (AFSCK) for transferring the serial data within the shift register, and control pulses (AFLCK) for use in latching a parallel datum from the shift register, and in determining gains and emission timings for the LEDs 3a to 3c. An analog signal output from the autofocus IC 12 is converted by the A/D converter 29 to a 7 bit digital signal (corresponding to a value of 0 to 127 in decimal notation) corresponding to the analog signal voltage level.

Figure 5:
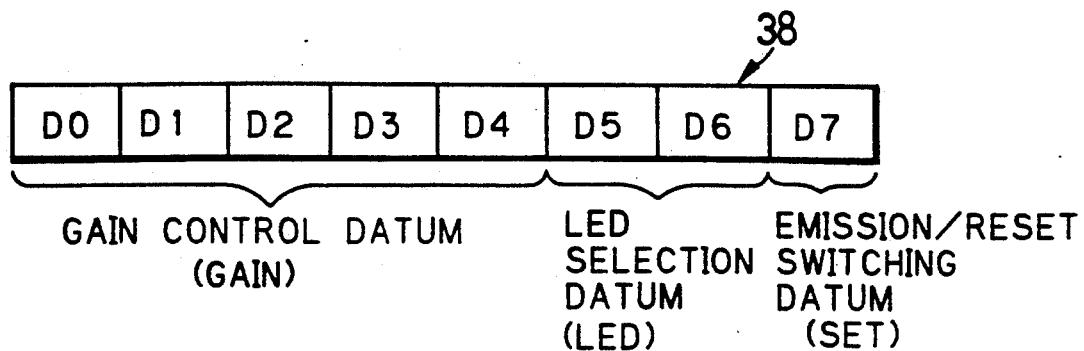
FIG. 5 conceptually shows a shift register used in a logic circuit.

FIG. 5 conceptually shows the 8 bit serial-in and parallel-out shift register 38 used in the logic circuit 32. A gain control datum (GAIN) is allocated at the 5 bit field from D0 to D4, an LED selection datum (LED) at the 2 bit field from D5 to D6, and an emission/reset switching datum (SET) at the one bit field D7. The 5 bit gain control datum can represent gain levels from a "0" level to a "31" level, in decimal notation. Similarly, the 2 bit LED selection datum can represent four states of "0" to 37 3" in decimal notation. At the "0" state, all the LEDs 3a to 3c are turned off, at the "1" state only the LED 3a is turned on, and at the "2" and "3" states each of the LEDs 3b and 3c are turned on, respectively.

Figure 6:
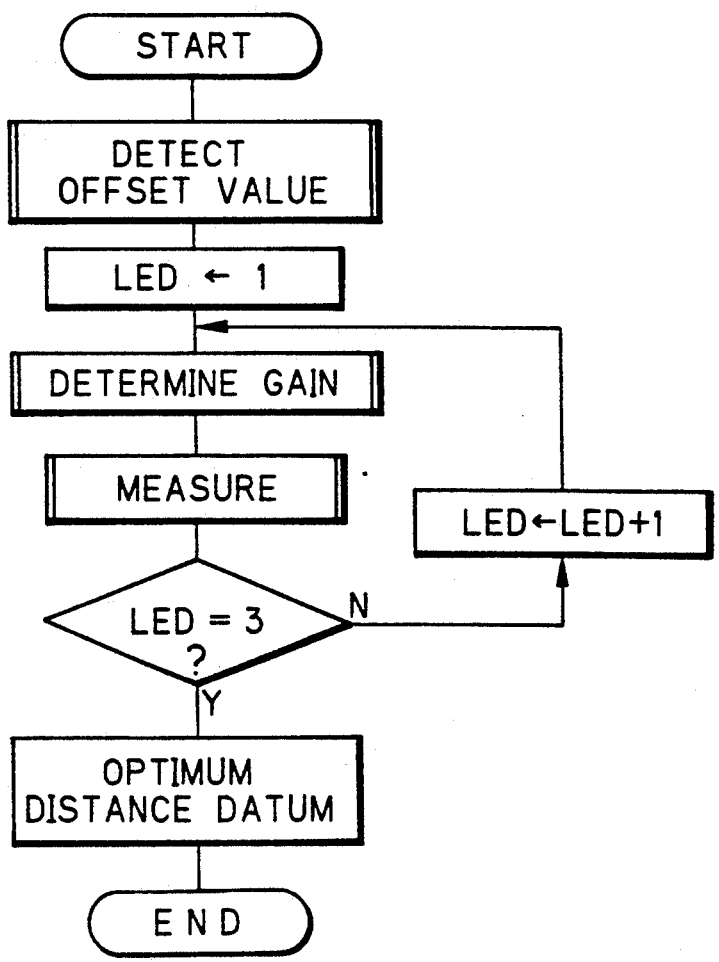
FIG. 6 is a flow chart showing an overall rangefinding sequence.

In the basic rangefinding sequence shown in FIG. 6, the sequence includes a process for detecting an offset value of an amplifier system of the autofocus IC 12, a process for measuring data for the LEDs 3a to 3c while sequentially driving the LEDs 3a to 3c, a process for calculating a plurality of distance data for each LED corresponding to an object distance as determined by the measurement data, and a process for selecting the optimum distance data. Prior to the process of measuring the data, a gain setting process is carried out for setting the gains of the gain control amplifiers 35a and 35b to optimum values.

The operation of the embodiment constructed as above will now be described with reference to FIGS. 7 to 14. As shown in FIG. 7, when the power-on switch of the camera is turned on, data storage areas of RAM 26 are reset to their initial state and thereafter data are read from the external data input unit 30. After confirming a stand-by photography state such as completion of film loading, lens barrier opening and the like, a flash check command stored before hand in ROM 25 is supplied by microcomputer 14 as a serial command datum to the flash control IC 18 via the bus line 27 and serial I/O port 28. Upon reading this command datum, the flash control IC 18 checks the charge level of the main capacitor of the flash device 22. If the charge level is insufficient, a charging process is executed. After the charging is completed, a charge completion signal is sent to CPU 24 via the A/D converter 29 and the serial I/O port 28. After the main capacitor of the flash device is completely charged, the locked state of the shutter button 19 is released to allow depression of the shutter button 19.

The shutter button 19 is depressed half-way after the camera is oriented such that a portion of a test object is positioned within and extends horizontally of a target mark displayed within the viewfinder. A signal representative of the half-depression of the shutter button 19 is supplied to the external data input unit 30 from CPU 24. Then, CPU 24 outputs a rangefinding command to the autofocus IC 12 which in turn drives the light projector 2 to periodically emit a near infrared spot light beam and project it toward the object. The near infrared light reflected from the object is detected with the light receiver 7 to measure the distance to the object.

After the above rangefinding operation, the CPU 24 sends photometry command data to the exposure control IC 16 to start measuring the object brightness. This command data is a parallel multi-bit datum containing film sensitivity information supplied from the external data input unit 30. The parallel command datum is converted into a serial command datum by the serial I/O port 28 in a manner similar to the command transfer to the autofocus IC 12, so that the serial command datum is sent to the exposure control IC 16.

In accordance with an object brightness signal generated by the photometric element 16a and a film sensitivity signal sent from the CPU 24, the exposure control IC 16 calculates an exposure time suitable for a proper exposure. The calculated analog exposure time datum is converted to a digital value by the A/D converter 29, whereupon it is sent to the CPU 24 via the serial port 28 and the bus line 27, and is stored in the RAM 26.

After exposure calculation, under control of the CPU 24, clock pulses corresponding in number to a distance datum and stored in RAM 26 are sent to the lens position controller 15. Then, the stepping motor 15a is driven to move the taking lens 5 to an in-focus position corresponding to the distance datum. Next, when the shutter button 19 is fully depressed and a signal to that effect is supplied from the external data input unit 30 to the CPU 24, the program shutter 20 is operated in accordance with the exposure time produced by the exposure calculation process, thereby to take an object image. Specifically, the exposure time datum read form the RAM 26 is converted into the corresponding number of clock pulses by the CPU 24 so that serial clock pulses corresponding in number to the exposure time datum are supplied from the serial I/O port 28 to the exposure control IC 16. Then, the stepping motor 16b drives the program shutter 20 in accordance with the calculated exposure time.

After photographing, the CPU 24 sends a film transport command to the film transport control IC 17. The motor 17a is then driven to cause the film transport mechanism 21 to advance the film by one frame. During this film advancement, the CPU 24 monitors the number of perforations in the advancing film in accordance with signals fed back from the film transport control IC 17. When the number of detected perforations equals that corresponding to one frame (e.g. eight perforations), the CPU 24 sends a stop command to the film transport control IC 17 to stop advancing the film. After advancing the film by one frame, the CPU 24 sends reset signal to the lens position controller 15 so as to move the taking lens 5 to the initial position, thereby to complete one cycle of a photographing sequence.

The film transport control IC 17 also sends via the A/D converter 29 to the CPU 24 data representative of the amount of current flowing through the motor 17a. Accordingly, should it become impossible to transport the film and should the load current of the motor 17a exceed a predetermined value, the control will automatically revert to a film rewinding mode.

As is illustrated in the flow chart of FIG. 7, pressing the self-timer mode button 40 while keeping the shutter button 19 half-depressed causes the operating sequence of the camera to depart from the ordinary photography modes and to enter the inspection mode, in which various data obtained in the rangefinding procedure are externally indicated. The inspection mode is terminated by pressing the daylight synchro button 41. In the inspection mode, even a full depression of the shutter button 19 will have no effect.

Figure 8:
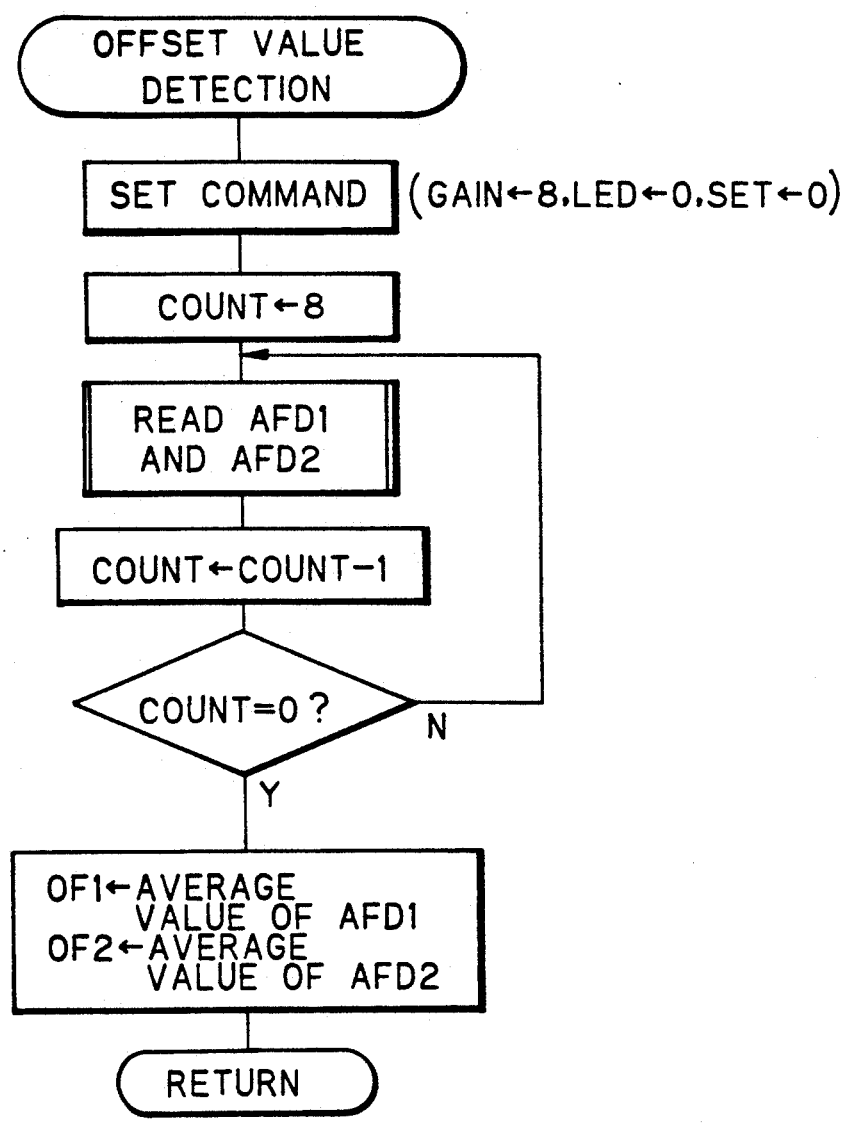
FIG. 8 is a flow chart illustrating the procedure of detecting an offset value.
Figure 9:
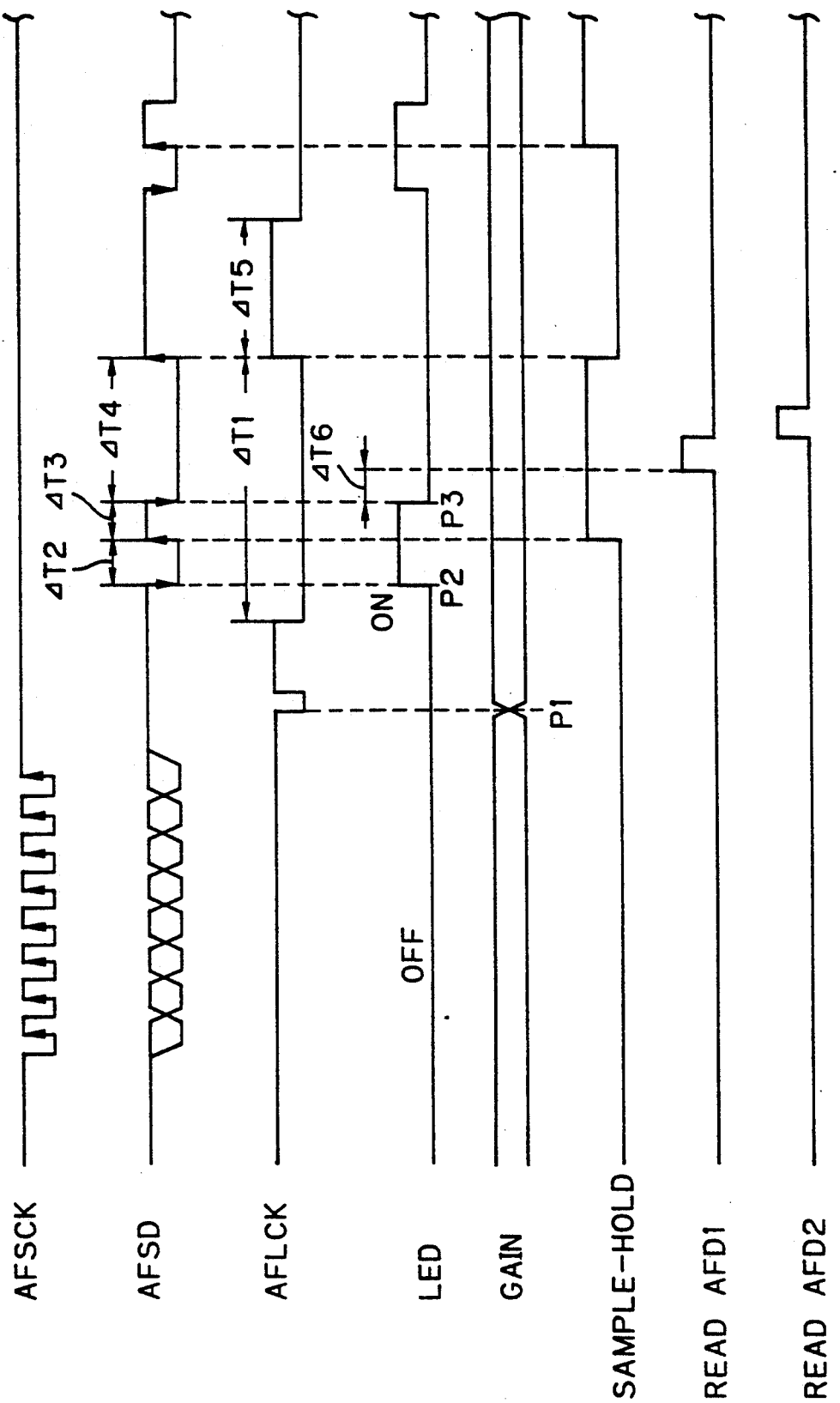
FIG. 9 is a timing chart showing the times at which the measurement data is read.
Figure 10:
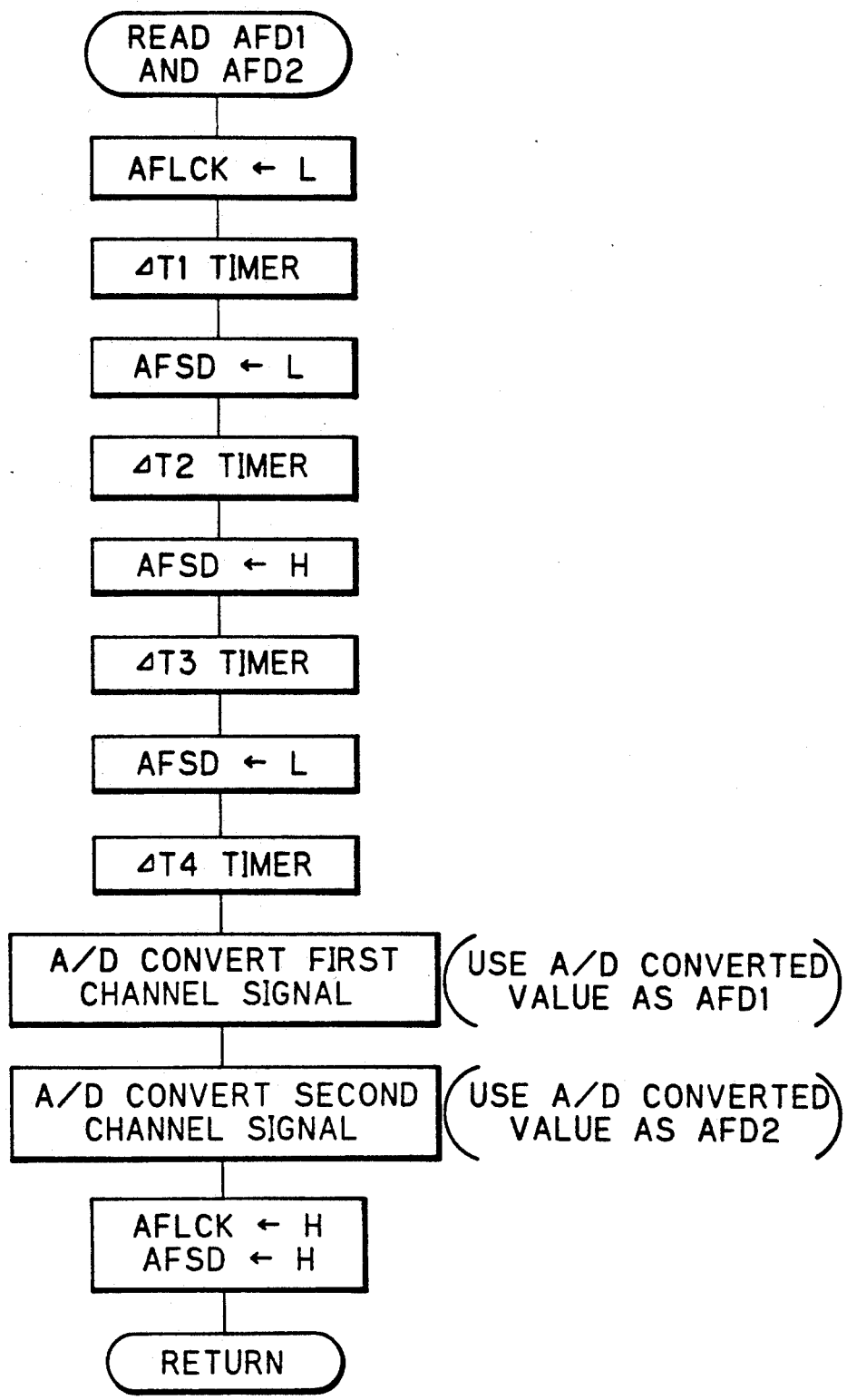
FIG. 10 is a flow chart illustrating the procedure of reading measurement data.

The measurement of an object distance will now be described in detail. At the beginning of the rangefinding sequence, the procedure of correcting an offset value is executed as shown in FIG. 8. An offset value is calculated according to a datum measured when all of the LEDs 3a to 3c are turned off. For the offset value correcting procedure, the word "01000000" (binary value) is set in the shift register 38 at the bit positions "D0 to D7". Command data for "GAIN=8", "LED=0" and "SET=0" is set accordingly. The command data is latched in a latch circuit when the control pulse AFLCK becomes low level at the time P1 shown in the timing chart of FIG. 9, i.e., after eight transfer pulses AFSCK have been output and 8 bit data is set in the shift register 38. The serial data pulses are sequentially transferred to the shift register 38 at the rising edge of the transfer pulse AFSCK. After transferring the above command data, a datum "COUNT=8" is set in a predetermined register within the CPU 24.

Of the command data set in the shift register 38, the datum "GAIN=8" is supplied via the gain controller 33 to the gain control amplifiers 35a and 35b to set the gains thereof to the value "8". The value "GAIN=31" corresponds to the maximum amplification factor, and the value "GAIN=0" corresponds to the minimum amplification factor.

After transferring this serial data, output signals from the first and second channels are sampled and held, the A/D converter data AFD1 and AFD2 thereof being read into the microcomputer 14. In this data reading procedure, as shown by the timing chart of FIG. 9 and the flow chart of FIG. 10, the control pulse AFLCK is made low during a period ΔT1. At the time when the serial data pulse AFSD changes its level during this period, the LEDs 3a to 3c, the sample-and-hold circuits 36a and 36b and other circuits are controlled. The time P2 when the signal AFSD becomes low level is used as the time of light emission for the LEDs 3a to 3c. However, during the offset value detecting procedure, the command "LED=0" is in force so that none of the LEDs 3a to 3c are turned on.

After a time period ΔT2 beginning at time P2, the signal AFSD becomes high level. At that time the sample-and-hold circuits 36a and 36b hold the output signals from the gain control amplifiers 35a and 35b. The output signals have been amplified by the gain control amplifiers 35a and 35b at a gain value "GAIN=8". After passage of a further time period ΔT3, the signal AFSD becomes low level, which is used as a light emission stop signal for the LEDs 3a to 3c, and then resumes a high level after passage of a time period ΔT4. The signal AFLCK resumes a high level at the end of the low level time period ΔT1. After this high level time period ΔT5, one operating cycle is complete.

After a time period ΔT6 from the time P3 when the signal AFSD becomes low level, the output signals held by the sample-and-hold circuits 36a and 36b are supplied to the buffer amplifiers 37a and 37b and to the A/D converter 29 wherein they are converted into 7 bit digital signals which are stored in RAM 26 at predetermined addresses, under control of CPU 24, as the first and second channel measurement data AFD1 and AFD2. Reading of the measurement data AFD1 and AFD2 is repeated eight times. Two sets of eight measured data for the first and second channels are averaged and used as offset values OF1 and OF2 to be stored in predetermined address positions in RAM 26.

After generating the offset values, the procedure of determining a gain and measuring an object distance is carried out individually for each of the LEDs 3a to 3c. The gain determining procedure is executed in accordance with the flow chart shown in FIG. 11. At the start of the gain determining procedure, flags "GFLAG", "OVFLAG" and "GCOUNT" in RAM 26 are set to an initial state of "0". Thereafter, a serial datum representative of a new command is transferred from the serial I/O port 28 to the logic circuit 32. Namely, a binary datum "01000011" is set in the shift register 38 at the corresponding bit positions thereof. Thus, there is provided a command of "GAIN=8", "LED=1" and "SET=1". In this condition, only the LED 3a is allowed to emit light.

After setting the above new command, measurement data AFD1 and AFD2 are read in a manner similar to the operation of the offset value detecting procedure. In this case, as seen from the timing chart of FIG. 9, the LED 3a is turned on during the time period "ΔT2+ΔT3". Also in this case, a pulse light from the LED 3a as shown in FIG. 1 is applied to the main object S1, and the reflected light is incident upon the PSD 9 via the light receiving lens 8. Signals output from the terminals 9a and 9b of the PSD 9 contain information regarding the intensity and position of reflected light incident upon the PSD 9.

After the two channel signals are converted to digital signals in the A/D converter 26 and read in CPU 24 as the measurement data AFD1 and AFD2, it is judged whether their values attain that of decimal number "127". If the value AFD1 or AFD2 reaches the number "127", it means that the corresponding measurement datum has gone off scale (overflowed) and that the amount of incident light upon the PSD 9 is quite great. Accordingly, the measurement data in this case is considered as unreliable. In this case, therefore, after confirming the value "GAIN=8", a procedure of "AFRESULTa←127" to be described later is carried out. This case corresponds to that in which an object at the central area of a scene is at a near position, and the reflected light is too strong even at a relatively low gain of "GAIN=8". Though the minimum gain is "8" in the present embodiment, the minimum gain is variable depending on the type and dimension of the circuits to be applied in the invention, as well as depending on the intensity of light form the LED employed. It is noted that "AFRESULTa" designates an object distance measured by actuating the LED 3a.

Figure 12:
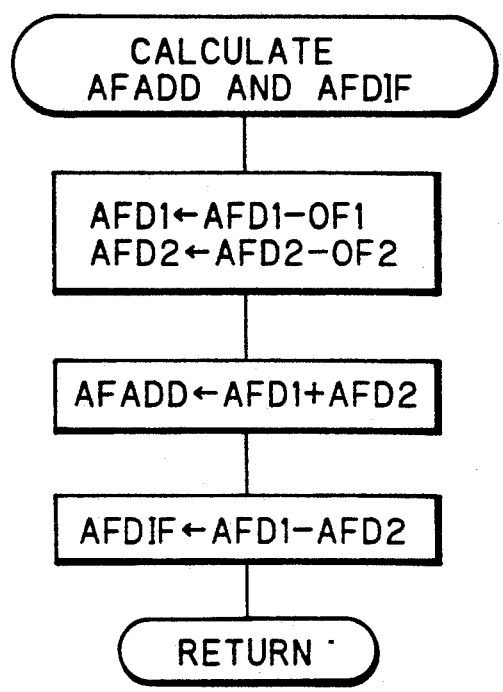
FIG. 12 is a flow chart illustrating the procedure of calculating an addition measurement datum and a subtraction measurement datum.
Figure 13:
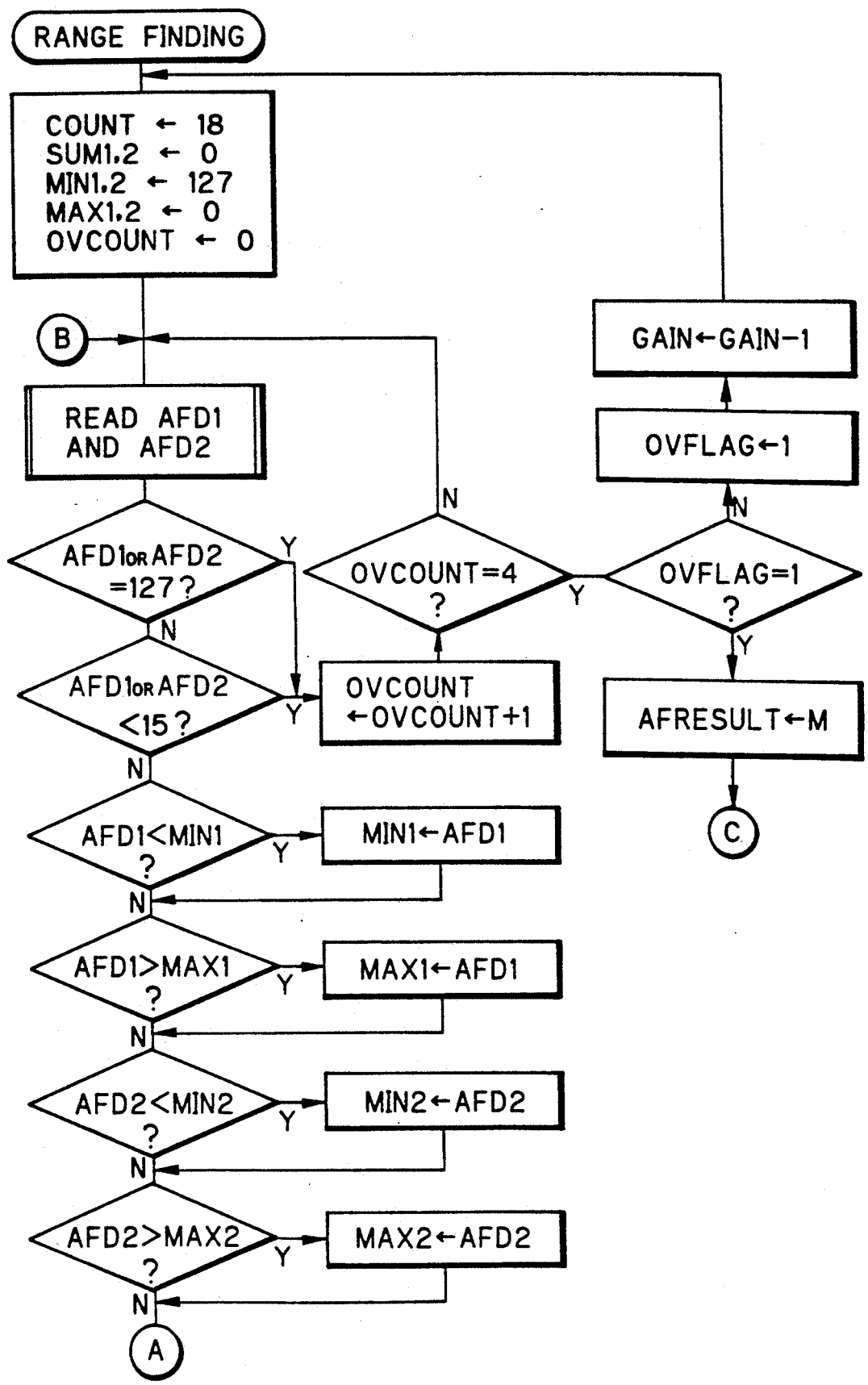
FIG. 13 is a flow chart showing the earlier part of a procedure for calculating distance data.

If there is no overflow of the measurement data AFD1 and AFD2, the procedure of calculating an additive datum AFADD and subtractive datum AFDIF is performed by adding the measurement datum AFD1 to the datum AFD2 and by subtracting the measured datum AFD2 from the datum AFD1, respectively, as shown in FIG. 12. In this calculation procedure, in order to remove noise components of the data values, offset values OF1 and OF2 are subtracted from the measurement data AFD1 and AFD2, respectively. It is then determined whether the additive datum AFADD has a value greater than or equal to "136". If the value is greater than or equal to "136", it is judged that the absolute values of the measurement data AFD1 and AFD2 are within a range suitable for the succeeding rangefinding calculation, and the current "GAIN" value is chosen as the gain of the gain amplifiers 35a and 35b at that time. In this condition, the rangefinding procedure for the LED 3a proceeds as illustrated in FIG. 13.

On the other hand, if the additive measurement datum AFADD has a value less than "136", then after confirming that the flag "GFLAG" is not "1", which is representative of an improper "GAIN" value, a factor "N" is added to the "GAIN" value in order to increase the absolute values of the measurement data AFD1 and AFD2. The value "N" is defined in accordance with the value of the additive measurement datum AFADD as shown Table 1.

TABLE 1

| AFADD | 98 or more | 97 down to 70 | 69 to 50 | 49 to 36 | 35 to 26 | 25 to 19 | 18 to 14 | 13 or less |
|---|---|---|---|---|---|---|---|---|
| N | +1 | +2 | +3 | +4 | +5 | +6 | +7 | +8 |

For the process of changing the "GAIN" value, a new "GAIN" value is set in the shift register 38 at the bit positions "D0 to D3". In accordance with the new "GAIN" value, the gain controller 33 sets the gains of the gain control amplifiers 35a and 35b, and similar operations as above are repeated thereafter. During this repeated process, an overflow will be deemed to occur at "GAIN<8". In this case, "GFLAG" is set to "1" and the "GAIN" value is changed to a value that is smaller than "1".

If even at the maximum "GAIN" value of "31" there is not obtained an additive datum AFADD having a proper absolute value, it means that the reflected light from an object is extremely weak or not present on the PSD 9. The latter case corresponds to that in which the object is at infinity, so that a rangefinding procedure as below is of little benefit. In such cases, the procedure "AFRESULTa←0" is executed without rangefinding.

The number RN of times that the gain is redetermined in the gain determining procedure is a function of the initial value IG of the gain, the maximum value GM of the gain, and the maximum value NM of the additive factor N, as follows:

$$RN = (GM - IG)/NM$$

Because GM=31, IG=8 and NM=8 in the present embodiment, RN=2.9, or approximately 3. The number RN of gain redeterminations is thus limited to three, so that the gain is determined upon reaching a state of "GCOUNT=3". Due to this limitation, no long waiting periods are required for the gain determining procedure even if the values of the measurement data AFD1 and AFD2 are changed by a change in the intensity of the light beams reflected by the object, thereby making it possible to determine the gain rapidly. Because the maximum number of gain redeterminations is determined by dividing the maximum additive factor "8" into the range "31−8" of gain regulation, the gain value can be regulated up to the maximum value "31" even when the value of AFADD is exceedingly small.

Figure 14:
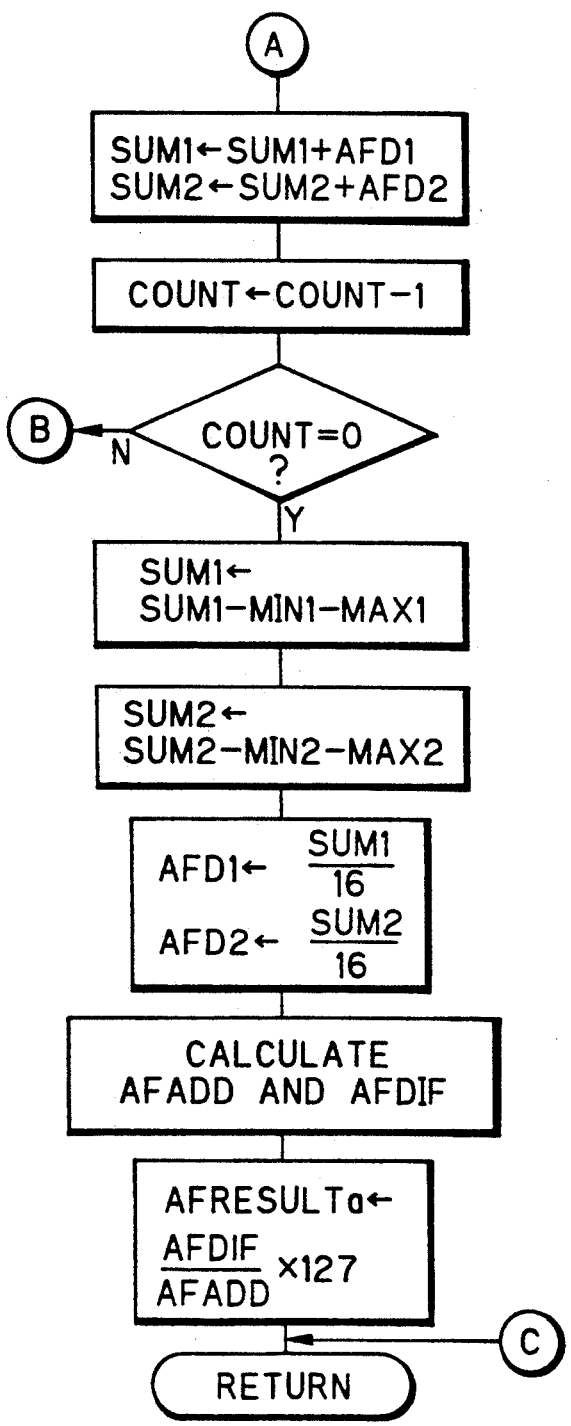
FIG. 14 is a flow chart showing the later part of the procedure for calculating the distance data.

After the "GAIN" value is determined by the above-described procedure, the determined "GAIN" value is written in RAM 26. The gain value of the gain control amplifiers 35a and 35b are unchanged during further execution of the rangefinding procedure for the LED 3a. The rangefinding procedure is shown in FIGS. 13 and 14. In this rangefinding procedure, the LED 3a is turned on eighteen times, and for each emission, the corresponding measurement data AFD1 and AFD2 are read. Each time the measurement data AFD1 and AFD2 are read, it is determined whether they overflowed, and whether their absolute values are smaller than "15" below which the data values are insufficient for the succeeding rangefinding operation. If the measurement data AFD1 and AFD2 are judged as improper, a count "OVCOUNT" is incremented by "1". On this occasion, without performing a decrement by "1" in "COUNT", a light beam is then projected again.

When the count "OVCOUNT" reaches "4", it is judged that the "GAIN" value determined by the g in determining procedure is improper. In this case, the flag "OVFLAG" is set to "1" and the "GAIN" value is reduced by "1" to again perform the rangefinding from the initial condition. In order to prevent the rangefinding from being repeated too many times, if the count "OVCOUNT" again reaches "4" after the flag "OVFLAGF" has already been once set to "1", then the value of "AFRESULTa" is defined as the "M" corresponding to the "GAIN" value at that time. In determining the value "M", Table 2 is referred to.

TABLE 2

| GAIN | 31 | 30 | 29 to 27 | 26 to 25 | 24 or less |
|------|----|----|----------|----------|------------|
| M    | 0  | 10 | 21       | 25       | 35         |

During the procedure of reading the measurement data AFD1 and AFD2 eighteen times, the minimum values and maximum values for the two channels are checked, and the measurement values AFD1 and AFD2 are summed for each channel as "SUM1" and "SUM2". The maximum and minimum values of AFD1 and AFD2 are subtracted from the sum values "SUM1" and "SUM2", respectively, in order to increase the reliability of the average value, and thereafter the average values are calculated. When calculating the average values, the basis number of measurements is "16", because the maximum and minimum values are excluded from the sum values. Although the sum values "SUM1" and "SUM2" are preferably divided by the effective number of measurements "16", this exclusion may be omitted, in case the number of measurements will become "18" by which the sum values may be divided, although the precision in rangefinding will be lower.

The obtained average values for the respective channels are subjected to the correction by offset values in accordance with the procedure shown in FIG. 12, and thereafter they are transformed into the additive datum AFADD and subtractive datum AFDIF. A ratio of these data is multiplied by "127" to obtain "AFRESULTa", whereby the rangefinding procedure for the LED 3a is completed. The respective values of "SUM1", "SUM2", "AFADD" and "AFD1F" obtained in the rangefinding procedure are written in RAM 26.

Next, the LED 3b is energized to carry out the gain determining and rangefinding procedures, and then the LED 3c is energized to carry out gain determining and rangefinding procedures, thereby to obtain the values of "AFRESULTb" and "AFRESULTc", respectively, which are written in RAM 26 together with data such as "AFADD" and "AFD1F" for the LEDs 3b and 3c.

The values of "AFRESULT" are the object distance data for the three LEDs 3a to 3c. In the scene shown in FIG. 1, "AFRESULTa" corresponds to the distance to the main object S1, "AFRESULTb" corresponds to the distance to the background object S2, and "AFRESULTc" is "0" (refer to FIG. 11) because the pulsed light beam is not reflected. In accordance with a program stored in ROM 235, the microcomputer 14 determines as an optimum distance datum the value representing the nearest object distance among the values "AFRESULTa", "AFRESULTb" and "AFRESULTc". At this stage, the rangefinding sequence is completed.

If the measurement data AFD1 and AFD2 overflow, the value of "AFRESULT" is "127", which corresponds to the nearest object distance. However, this singular value is not taken into account in determining the optimum distance datum. After determining the optimum distance datum in the above manner, the lens position controller 15 drives the stepping motor 15a to set the taking lens 5 to the lens position corresponding to that distance datum.

The inspection mode will now be described. Entry into the inspection mode is performed by a special operation of depressing the self-timer mode button 40 while halfway depressing the shutter button 19. In the inspection mode, repeated pressing of the self-timer mode button 40 serves successively to read out of the RAM 26 various data obtained in the rangefinding procedure already performed, which data are then indicated on the LCD 43 and LED 46, namely the offset values, the gain values of the gain control amplifiers 35a and 35b as determined for each of the LEDs 3a to 3c, the additive datum, the subtractive datum, "AFRESULT", and the optimum rangefinding datum. Besides these data regarding the rangefinding procedure, photometric data and data obtained from calculating the exposure amount may also be indicated externally.

Figure 15:
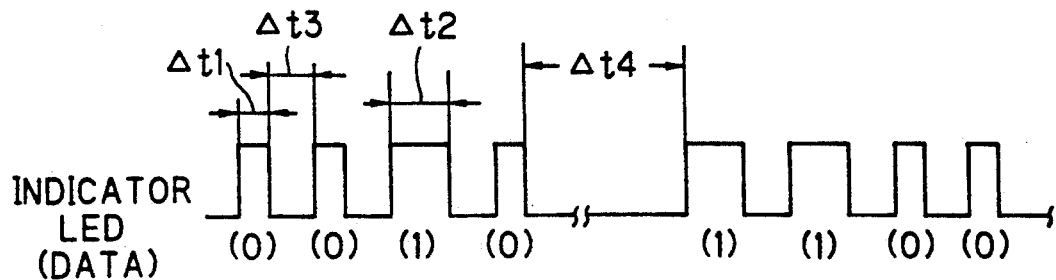
FIG. 15 is a time chart illustrating an example of an indicator LED in intermittent light emission at the time of an inspection mode.

The LCD indicator 43 displays the various data in numerals, whereas the LED 46 indicates them with light signals emitted intermittently. FIG. 15 shows an example of such an intermittent emission of light. A datum representing one numeral in decimal notation, as formed in four binary bits, is indicated. To be precise, a short light-emanating period $\Delta t1$ (100 $\mu$sec or shorter) represents "0" in binary code, while a long light-emanating period $\Delta t2$ (200 $\mu$sec of longer) represents "1". Light emission for indicating each bit is performed at intervals $\Delta t3$ (100 $\mu$sec). A dark period $\Delta t4$ of 1 msec represents a boundary between signals of two successive data. Instead of visually observing data on the LCD 43, light emission can be received and detected with a photosensor of a measuring device so as to automatically analyze the data by processing it in a computer. It is preferred in that case to read out a plurality of data automatically at a predetermined interval and indicate the data on the LED 45.

The various data obtained from an actual rangefinding operation are easily learned by applying the above inspection mode while the operation of the rangefinding device is tested as to a test object with a known object distance, in a final inspection process after manufacturing the camera. Accordingly, an inspection can be carried out with high reliability even without measuring the amount that the taking lens is advanced, for example. By comparing the data "AFRESULTa", "AFRESULTb" and "AFRESULTc" representing respective results of rangefinding using the LEDs 3a to 3c, the mounting position of the PSD 9 can be correctly adjusted, and in particular its inclination within a plane perpendicular to the optical axis 8a, as it would otherwise cause an error in rangefinding particularly in a multi-beam rangefinding device.

The above embodiment serves to inspect the rangefinding device as to whether it operates correctly by reading out the data relevant to rangefinding, and to permit adjusting the positions of the light projector and the light receiver in accordance with the read-out data if an error is found in the rangefinding. Conventional adjustment of a multi-beam type rangefinder is complicated and difficult, because such adjustment is necessary to obtain appropriate rangefinding data for the respective rangefinding light beams. Instead of this complicated adjustment, the rangefinding device according to the invention is controlled so as to perform an appropriate rangefinding with a standard rangefinding light beam or a reference rangefinding light beam consisting of a specified one of the three light beams, and so as to make a correction of distance data of other rangefinding light beams by using correction data prepared beforehand. This construction makes it unnecessary to perform the conventional laborious adjustment of the device.

FIGS. 16 to 21 illustrate an example embodying this construction, in which elements similar to those of the former embodiments are designated with identical reference numerals. Naturally, even an adjustment as to the reference rangefinding light beam will be unnecessary when correction data constituted by differences between correct distance data and actually measured distance data are prepared. It is possible in the present embodiment to read out data used for the rangefinding calculation in the same manner as described above.

Figure 16:
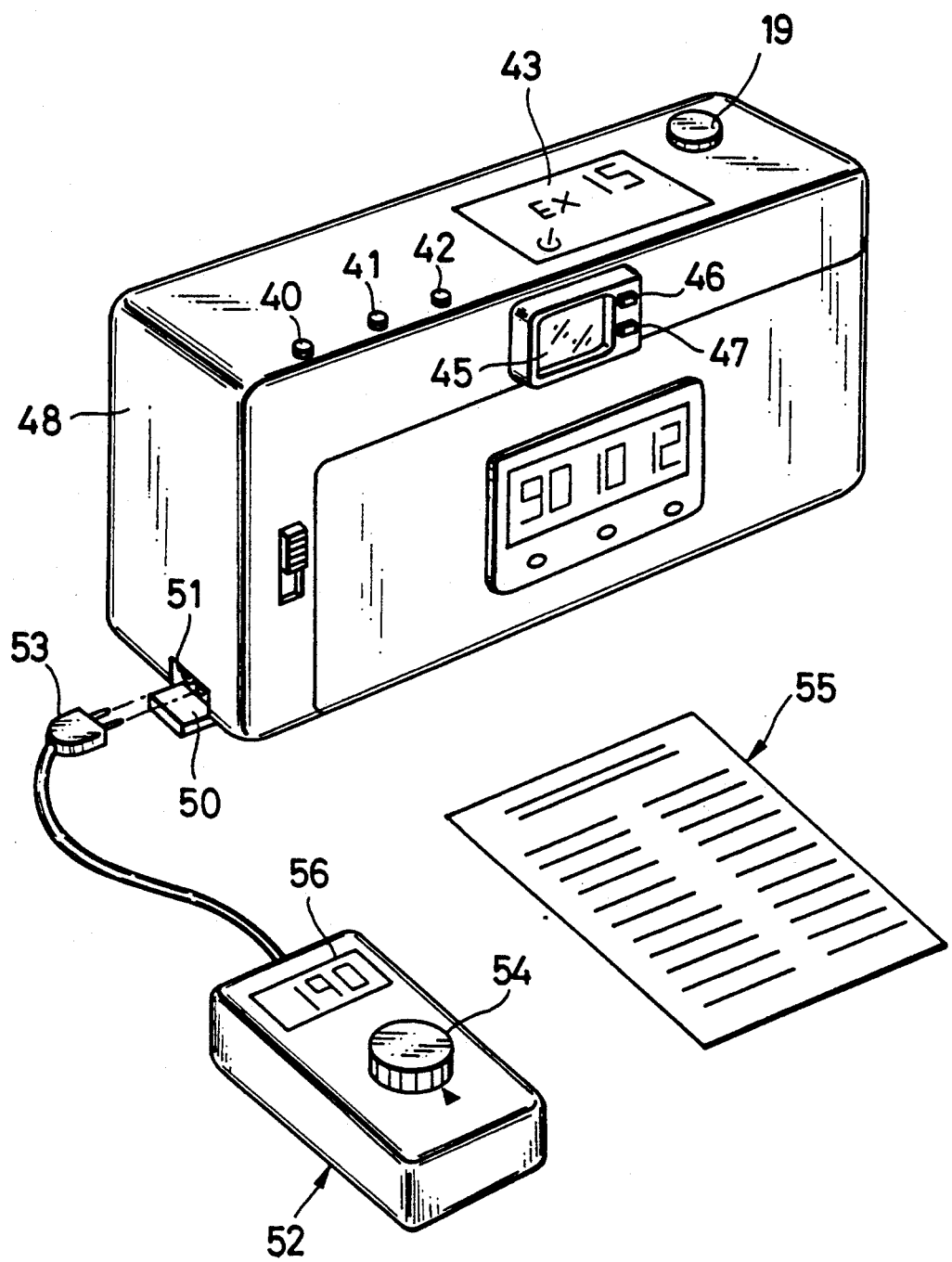
FIG. 16 is a perspective view illustrating an autofocus camera and a correction data input device in an embodiment in which correction calculation is performed using correction data.

Referring to FIG. 16, a cover member 50 is formed on a side of the camera body 48, and causes contact terminals 51 to be exposed when it is opened for inspecting the rangefinding device. A plug 53 of a correction data input device 52 is connected to the contact terminals 51. A dial 54 is provided on the correction data input device 52, and can be operated to enter correction data with reference to a reference list 55.

Figure 17:
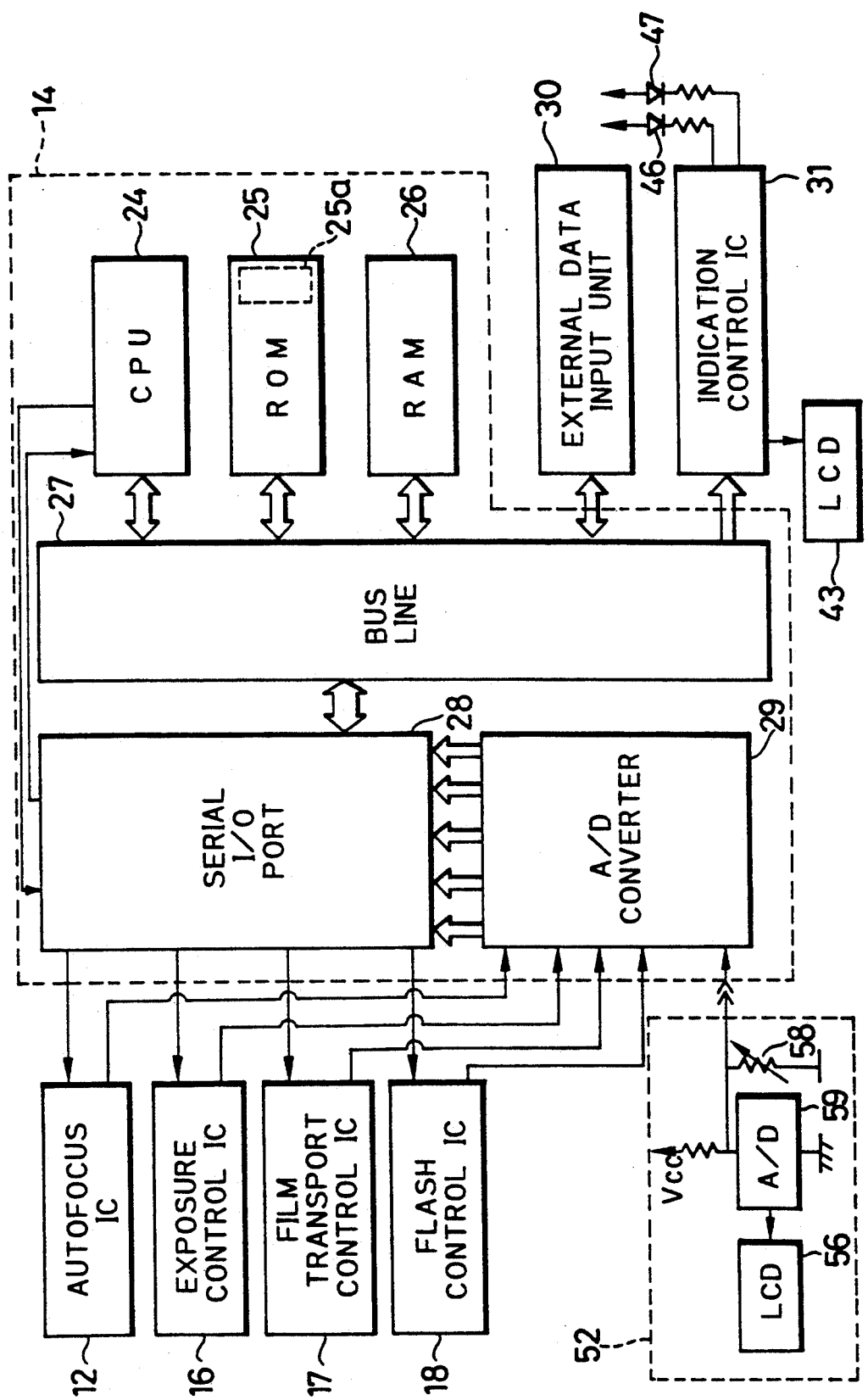
FIG. 17 is a block diagram showing the interface between the autofocus camera and the correction data input device.
Figure 19:
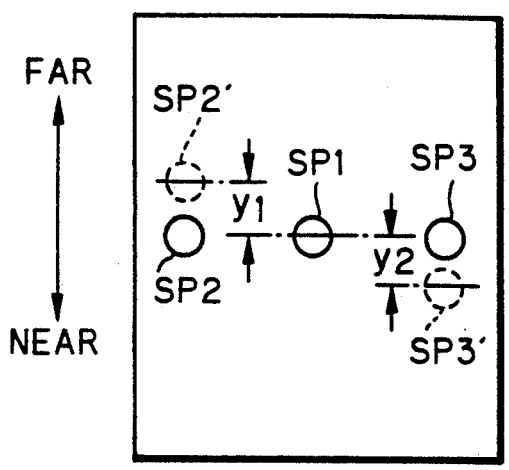
FIG. 19 is an explanatory view showing the positions at which reflected light beams are incident on a PSD.

As is illustrated in FIG. 17, the correction data input device 52 comprises an A/D converter 59, an LCD 56, and a potentiometer 58 linked with the dial 54. The A/D converter 59 digitally converts a voltage value depending on a change in resistance value of the potentiometer 58, and sends it to the LCD 56 as a correction datum. The correction datum is admitted in the microcomputer 14 via the A/D converter 29 so as to write it in the erasable ROM 25 in a correction data writing procedure.

The ROM 25 stores a correction data reference table 25a as illustrated in FIGS. 17 and 18. The correction data reference table 25a is used to perform correction so as to render coincident the distance data obtained from each of the three LEDs 3a to 3c corresponding to the same object. In other words, table 25a represents a relationship between A/D bit values and deviation amounts of rangefinding data for the respective LEDs 3b and 3c disposed on the right and left sides of LED 3a, by using as a reference datum the distance datum from the LED 3a for measuring the distance to the middle of the photographic scene. In accordance with a test result obtained when manufacturing the camera, one correction datum is specified and entered via the correction data input device 52. The reference list 55 carries the same data relationship printed thereon as the correction data reference table 25a.

For the distance datum "AFRESULTb or c" obtained by actuating the LEDs 3b and 3c, correction is performed based on a correction amount "Y" dictated by the correction data reference table 25a, unlike the distance datum "AFRESULTa" obtained when actuating the LED 3a. This is due to the following facts. Let the object distance be constant within the photographic scene, for example the surface of a wall. When the rangefinding light beam from the LED 3a is reflected by the object and is incident upon the PSD 9 in a position SP1 in FIG. 19, then the rangefinding light beam emitted from the LEDs 3b and 3c and reflected by the object should in principle be incident thereon in positions SP2 and SP3, at the same elevation as the position SP1 in relation to the vertical direction or the direction of the base line of triangulation, as indicated by the solid line circles in FIG. 19.

However, there might be an occasion in which the precision in the mounting position of the LED 3b or 3c or the PSD 9 is low, or in which the light projecting lens 4 and the light receiving lens 8 are not exactly coaxial. The reflected light beam generated upon actuating the LED 3b would in such case be incident at a position SP2' deviating upward from the theoretical incident position SP2 by an interval y1, whereas the reflected light beam of the LED 3c would be incident at a position SP3' deviating downward from the theoretical position SP3 by an interval y2, as indicated by the dashed line circles. Even when, for example, AFRESULTa=85" is obtained by rangefinding calculation from the incident position SP1, "AFRESULTb=81" and "AFRESULTc=88" for example would be calculated from the positions SP2' and SP3', so that a constant distance datum would not be achieved.

When such an error among a plurality of distance data is to be corrected by mechanically adjusting the mounting positions of the LEDs 3a to 3c or the PSD 9, a regulating operation would need to be highly precise. In order to have no need of such a fine mechanical adjustment, the correction data reference table 25a is used to correct the distance data in accordance with one correction datum. To specify one correction datum, the plug 53 of the correction data input device 52 is connected to the connecting terminals 51 with the cover member 50 open as illustrated in FIG. 16.

Figure 20:
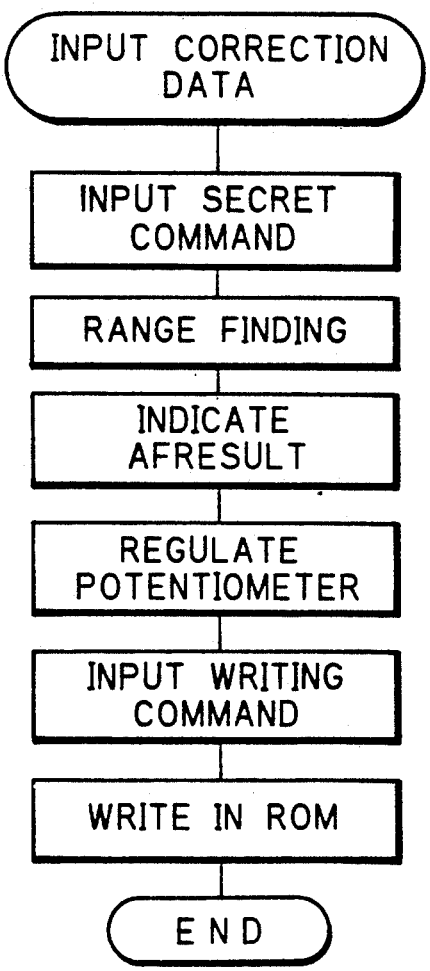
FIG. 20 is a flow chart illustrating a procedure of inputting and processing correction data.

As illustrated in FIG. 20, a secret command is entered by pressing the daylight synchro button 41 and the exposure correction button 42 simultaneously so that a program for a focus correcting mode is run. When running the focus correcting mode program, rangefinding is performed as to the test object as described above to obtain three distance data for the LEDs 3a to 3c. Then the values of the respective distance data "AFRESULTa", "AFRESULTb" and "AFRESULTc" are indicated on the LCD 43 mounted on the camera body 48 in a state of stand by for receiving an input.

The values of each distance datum indicated on the LCD 43 are referred to, so that differences of the "AFRESULTa" from "AFRESULTb" and AFRESULTc" can be read out visually. When an indication is "AFRESULTa"=85", "AFRESULTb=81" and "AFRESULTc=88", the deviating amounts are "−4" and "3", respectively, wherein the minus represents deviation in the direction of far distances, and the plus represents deviation in the direction of near distance. The already prepared reference list 55 is consulted to find "192" to "186" as a range A/D bit values corresponding to the combination (−4, 3) of the correction data.

The correction dial 54 of the correction data input device 52 is next operated. The resistance value of the potentiometer 58 in FIG. 17 is changed so as to change the voltage of its terminal. The voltage value of the terminal of the potentiometer 58 is digitally converted by the A/D converter 59, and indicated in the LCD 56 numerically. The correcting dial 54 is adjusted to confine the digital value indicated on the LCD 56 within the above range "192" to 186".

After determining the A/D bit value, the microcomputer 14 performs a procedure of reading the A/D bit value upon actuating the self-timer button 40. The voltage of the terminal of the potentiometer 58 is digitally converted in the A/D converter 29 of the camera, and is written in the ROM 25 for example as an A/D bit value "190" in a predetermined address position, thereby finishing the correction data input procedure.

Figure 21:
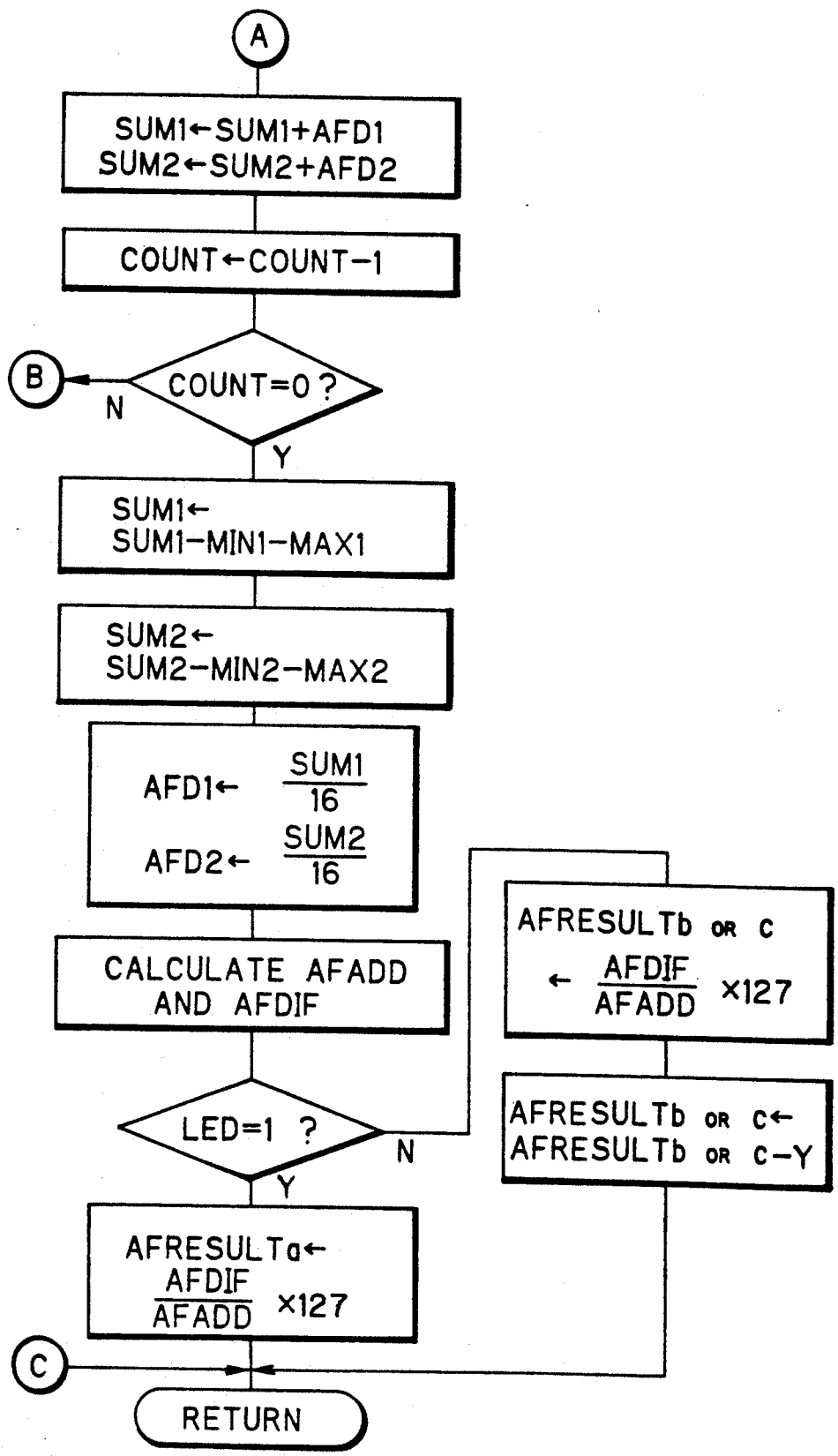
FIG. 21 is a flow chart illustrating a later part of the procedure of calculating the distance data in the embodiment where correction data is used.

With the correction data input procedure completed, rangefinding is carried out as described above. The obtained distance data "AFRESULTb" and "AFRESULTc" are subjected to correction by referring to the correction data reference table 25a as illustrated in FIG. 21, corresponding to FIG. 14. Although the distance data "AFRESULTb=81" and "AFRESULTc=88" are produced by calculation of only the respective actually measured data, correction is performed such that "AFRESULTb←AFRESULTb−Y" and "AFRESULTc←AFRESULTc−Y". Accordingly, distance data of "85" and "85" are respectively obtained so that the distance data are kept equal among the LEDs 3a to 3c.

As is described above, erroneous differences between distance data from the LEDs 3a to 3c are corrected by storing the correction data reference table 25a in the ROM 25, and by writing the A/D bit values in the ROM 25 as addresses for reading the values of the correcting amount Y during use while reading the corresponding rangefinding result out of the correction data reference table 25a. No mechanical adjustment of the mounting positions of the LEDs 3a to 3c or the PSD 9 is required, so that the efficiency in the manufacturing operation is improved. It is noted that A/D bit values in the correction data reference table 25a are defined in ranges each containing several values, because the regulation via the correction dial 54 is not excessively acute. Although the correcting amount Y takes on stepwise determined values, it is possible to decrease the interval of the stepwise values to determine the correcting amount Y more precisely.

Instead of using the correction data reference table 25a, differences of the distance datum "AFRESULTa" from the distance data "AFRESULTb" and "AFRESULTc" may be written in the ROM 25 in predetermined address positions during running of the focus correcting mode program, so that the written difference values can be used as correction data when calculating the distance data "AFRESULTb" and "AFRESULTc". Further, calculation of such differences may be automatically performed in the CPU 24 so as to write automatically the calculated differences in an erasable ROM as correction data.

In the above embodiment, three LEDs 3a to 3c are used and distances to three positions in a photographic scene are measured seriatim. The present invention is also applicable to rangefinding devices using one, two or four or more LEDs for projecting light toward the object. If a single LED is used, instead of a spot beam an elongated slit of light may be emitted or a single spot light beam may be moved to scan a photographic scene by swinging the LED. A distance datum may be obtained by projecting light once, in a manner similar to a conventional rangefinding apparatus in a camera. The posture of the light projector 2 may be changed with the camera posture in order to emit a plurality of spotlight beams held parallel to the ground surface. As a light receiving element, CCD image sensors or the like may be used. As a light source, a flash tube, a lamp or the like may be used.

While the invention has been described in detail above with reference to several preferred embodiments thereof, various changes and modifications within the scope and spirit of the invention will be apparent to people of ordinary skill working in this technological field. Thus, the invention should be considered as limited only by the scope of the appended claims.

What is claimed is:

1. An autofocus camera comprising a rangefinding device, a microcomputer for calculating distance data for positioning a taking lens in accordance with measurement data produced by said rangefinding device, and indicator means for indicating scene-taking information, said camera further comprising:
   memory means for storing data obtained in a rangefinding calculation, said stored data including said measurement data; and
   means for reading said stored data out of said memory means during an inspection mode so as to indicate said stored data in said indicator means.

2. The autofocus camera as defined in claim 1, further comprising first externally operable means for specifying said inspection mode.

3. The autofocus camera as defined in claim 2, further comprising second externally operable means for reading out said stored data in a predetermined order.

4. The autofocus camera as defined in claim 2, wherein:
   said rangefinding device includes light projector means for projecting at least one rangefinding light beam onto different objects within a scene to be photographed, and light receiver means for receiving a reflected light beam returned from said scene so as to generate a signal according to an incident position of said reflected light beam; and
   said microcomputer being adapted to select an optimum rangefinding datum from said measurement data.

5. The autofocus camera as defined in claim 4, wherein said light projector means includes a plurality of light sources arranged in a row.

6. The autofocus camera as defined in claim 5 wherein said light sources are LEDs for emitting near infrared light, and are arranged to follow a direction perpendicular to a base line.

7. The autofocus camera as defined in claim 6, wherein each of said LEDs are caused to emit light a plurality of times in order to obtain a plurality of measurement data so as to calculate a rangefinding datum for each said LED in accordance with an average value of said plurality of measurement data.

8. The autofocus camera as defined in claim 4, wherein said light receiver means comprises a PSD for outputting two channel currents.

9. An autofocus camera as defined in claim 8, wherein said rangefinding device further comprises:
   amplifying means for linearly amplifying said two channel currents and for outputting said two channel currents as analog signals; and
   means for A/D converting said analog signals into said measurement data in the form of digital pulses.

10. The autofocus camera as defined in claim 9, wherein said amplifying means comprises:
    two pre-amplifiers for converting said two channel currents from said PSD into corresponding voltage signals; and
    two gain control amplifiers each for amplifying a respective one of said voltage signals.

11. The autofocus camera as defined in claim 10, wherein said stored data comprises a plurality of rangefinding data and said optimum rangefinding datum.

12. The autofocus camera as defined in claim 11, wherein said stored data further comprises offset values of said gain control amplifiers and gain values corresponding to each of said LEDs.

13. The autofocus camera as defined in claim 12, wherein said indicator means is a light emitting indicator for emitting light intermittently to indicate said stored data as light signals.

14. The autofocus camera as defined in claim 12, wherein said indicator means is a liquid crystal display panel for indicating said stored data in numerical patterns.

15. The autofocus camera as defined in claim 10, further comprising second memory means in which at least one correction datum is written, said correction datum being constituted by a difference of a reference distance datum from at least one other distance datum, said reference distance datum being obtained by performing rangefinding of a test object with a reference LED selected from one of said plurality of LEDs, at least one other distance datum being obtained by performing rangefinding of said test object with another of said plurality of LEDs, said at least one correction datum in said second memory means being used when calculating a rangefinding datum for said another LED.

16. The autofocus camera as defined in claim 15, wherein said plurality of LEDs are three LEDs arranged in a row, a central LED of said three LEDs being used as said reference LED and being adapted to project a spot light beam to a middle portion of said scene to be photographed.

17. An autofocus camera comprising a rangefinding device provided with a plurality of LEDs and one PSD for optically triangulating different regions within a scene to be photographed, a microcomputer for calculating rangefinding data according to measurement data output from said rangefinding device corresponding to each of said LEDs, and a light emitting indicator for indicating scene-taking information by intermittent emission of light, said autofocus camera further comprising:
    memory means for storing data obtained by calculating said rangefinding data;
    externally operable means for selecting an inspecting mode; and
    means for reading said stored data out of said memory means and for sending said stored data to said light emitting indicator, for displaying said stored data as light signals by intermittent light emission.

18. The autofocus camera as defined in claim 17, wherein each of said LEDs is caused to emit light a plurality of times to obtain a plurality of measurement data, an average value of said plurality of measurement data being used for calculating a respective rangefinding datum for each of said LEDs.

19. The autofocus camera as defined in claim 18, wherein said plurality of LEDs are three LEDs arranged in a row.

20. An autofocus camera comprising a rangefinding device provided with a plurality of LEDs and one PSD for optically triangulating different regions within a scene to be photographed, a microcomputer for calculating rangefinding data according to measurement data output from said rangefinding device corresponding to each of said LEDs, and a liquid crystal display for indicating scene-taking information, said camera further comprising:
    memory means for storing data obtained by calculating said rangefinding data;
    externally operable means for selecting an inspecting mode; and
    means for reading said stored data out of said memory means and for sending said stored data to said liquid crystal display, for displaying said stored data in numerical symbols.

21. The autofocus camera as defined in claim 20, wherein each of said LEDs is caused to emit light a plurality of times to obtain a plurality of measurement data, and average value of said plurality of measurement data being used for calculating a respective rangefinding datum for each of said LEDs.

22. The autofocus camera as defined in claim 21, wherein said plurality of LEDs are three LEDs arranged in a row.

23. An autofocus camera comprising light projector means for projecting rangefinding light beams onto different regions within a scene to be photographed, light receiver means for receiving light beams reflected from the different regions of said scene, and a microcomputer for calculating a set of measurement data output from said light receiver means to obtain rangefinding data corresponding to said set of measurement data and for selecting one of said rangefinding data, said autofocus camera further comprising:
    memory means in which at least one correction datum is written, said correction datum being a difference of a reference distance datum from at least one other distance datum, said reference distance datum being obtained by performing rangefinding of a test object with a reference rangefinding light beam, one of said plurality of said rangefinding light beams being said reference rangefinding light beam, at least one other distance datum being obtained by performing rangefinding of said test object with another of said rangefinding light beams; and
    means for correcting a rangefinding datum of said another rangefinding light beam by using said at least one correction datum when calculating said rangefinding datum.

24. The autofocus camera as defined in claim 23, wherein said light projector means includes a plurality of LEDs arranged side by side in a row.

25. The autofocus camera as defined in claim 24, wherein said light receiver means includes a PSD for outputting two channel currents.

26. The autofocus camera as defined in claim 25, wherein each of said LEDs are caused to emit light a plurality of times in order to obtain a plurality of measurement data so as to calculate a rangefinding datum of each said LED in accordance with an average value of said plurality of measurement data.

27. The autofocus camera as defined in claim 26, wherein said plurality of LEDs are three LEDs arranged in a row.

28. The autofocus camera as defined in claim 27, further comprising:
   amplifying means for linearly amplifying said two channel currents and for outputting said two channel currents as analog signals; and
   means for A/D converting said analog signals into said measurement data in the form of digital pulses.

29. The autofocus camera as defined in claim 28, wherein said amplifying means includes:
   two pre-amplifiers for converting said two channel currents from said PSD into corresponding voltage signals; and
   two gain control amplifiers each amplifying a respective one of said voltage signals.

30. A method for regulating an autofocus camera comprising light projector means for projecting rangefinding light beams onto different regions within a scene to be photographed, light receiver means for receiving light beams reflected form the different regions of said scene to be taken, and a microcomputer for calculating a set of measurement data output from said light receiver means to obtain rangefinding data corresponding to said set of measurement data and for selecting one of said rangefinding data, said method comprising the steps of:
   calculating a reference distance datum by performing rangefinding of a test object with a reference rangefinding light beam, one of said plurality of rangefinding light beams being said reference rangefinding light beam;
   calculating at least one other distance datum by performing rangefinding of said test object with another of said rangefinding light beams;
   obtaining at least one correction datum corresponding to a difference of said reference distance datum from said at least one other distance datum; and
   writing said at least one correction datum corresponding to said another rangefinding light beam in memory means.

31. The method as defined in claim 30, wherein said light projector means includes a plurality of LEDs arranged in a row to follow a direction perpendicular to a base line.

32. The regulating method as defined in claim 31, wherein said light receiver means includes a PSD for outputting two channel currents.

33. The regulating method as defined in claim 32, wherein each of said LEDs are caused to emit light a plurality of times in order to obtain a plurality of measurement data so as to calculate a rangefinding datum of each said LED in accordance with an average value of said plurality of measurement data.

34. The regulating method as defined in claim 33, wherein said plurality of LEDs are three LEDs arranged in a row.

* * * * *